(12) United States Patent
Takami et al.

(10) Patent No.: US 7,276,007 B2
(45) Date of Patent: Oct. 2, 2007

(54) HYBRID DRIVE UNIT

(75) Inventors: Shigeki Takami, Anjo (JP); Kozo Yamaguchi, Anjo (JP); Takeshi Inuzuka, Anjo (JP); Tomohiko Ito, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 222 days.

(21) Appl. No.: 11/089,204

(22) Filed: Mar. 25, 2005

(65) Prior Publication Data

US 2005/0221939 A1 Oct. 6, 2005

Related U.S. Application Data

(60) Provisional application No. 60/661,010, filed on Mar. 14, 2005.

(51) Int. Cl.
*F16H 3/72* (2006.01)
(52) U.S. Cl. ........................................... 475/5
(58) Field of Classification Search ............... 475/5
See application file for complete search history.

(56) References Cited

U.S. PATENT DOCUMENTS 5,730,676 A * 3/1998 Schmidt ................. 475/5
5,931,757 A 8/1999 Schmidt
5,980,410 A 11/1999 Stemler et al.
6,022,287 A 2/2000 Klemen et al.
6,455,947 B1 9/2002 Lilley et al.
2002/0142876 A1 10/2002 Holmes et al.
2003/0064846 A1* 4/2003 Klemen et al. ............. 475/5
2005/0064974 A1 3/2005 Bezian et al.
2006/0111213 A1* 5/2006 Bucknor et al. ............. 475/5

FOREIGN PATENT DOCUMENTS

EP 1 279 544 A 1/2003
EP 1 386 771 A 2/2004
JP A-2000-346187 12/2000
JP A-2002-293147 10/2002

\* cited by examiner

*Primary Examiner*—Ha D. Ho
(74) *Attorney, Agent, or Firm*—Oliff & Berridge, PLC

(57) ABSTRACT

A hybrid drive unit includes a three-element planetary gear coupled to two motors, and a reduction planetary gear which is drivingly connected to the three-element planetary gear and switches modes by controlling a clutch and a brake. A three-element direct drive mode is able to be achieved by providing another clutch which couples together any two elements of the reduction planetary gear, and locking up the reduction planetary gear. As a result, motor output is reduced compared with a four-element direct drive mode of related art during high-speed running, and energy recovery efficiency during regeneration can also be improved.

18 Claims, 36 Drawing Sheets

FIG. 2

|                 | B-1 | C-1 | C-2 |
|-----------------|-----|-----|-----|
| THREE – ELEMENT Lo | ○ | × | × |
| FOUR – ELEMENT     | × | ○ | × |
| THREE – ELEMENT Hi | × | × | ○ |

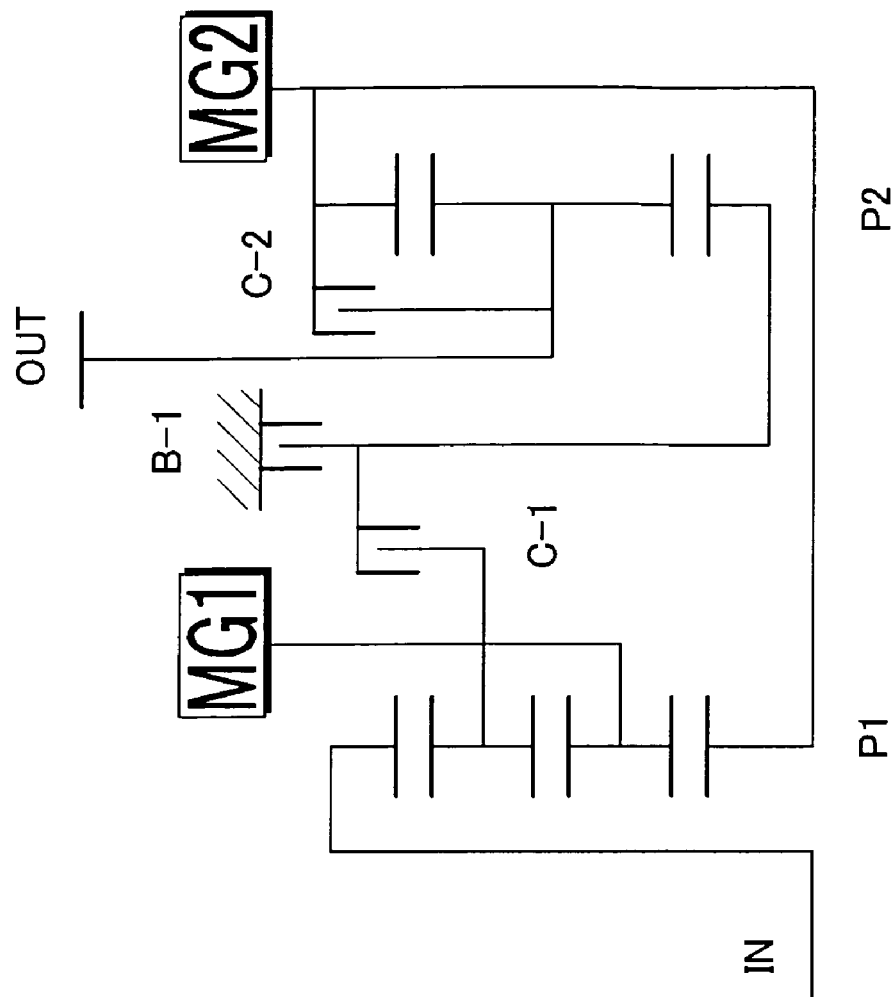
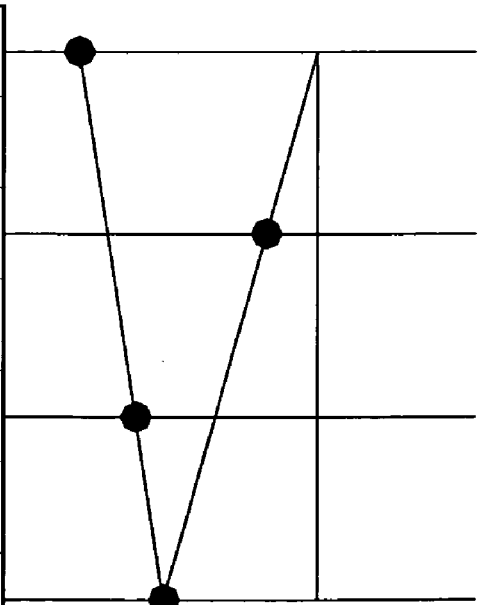
F I G . 7 (A)

F I G. 7 (B)
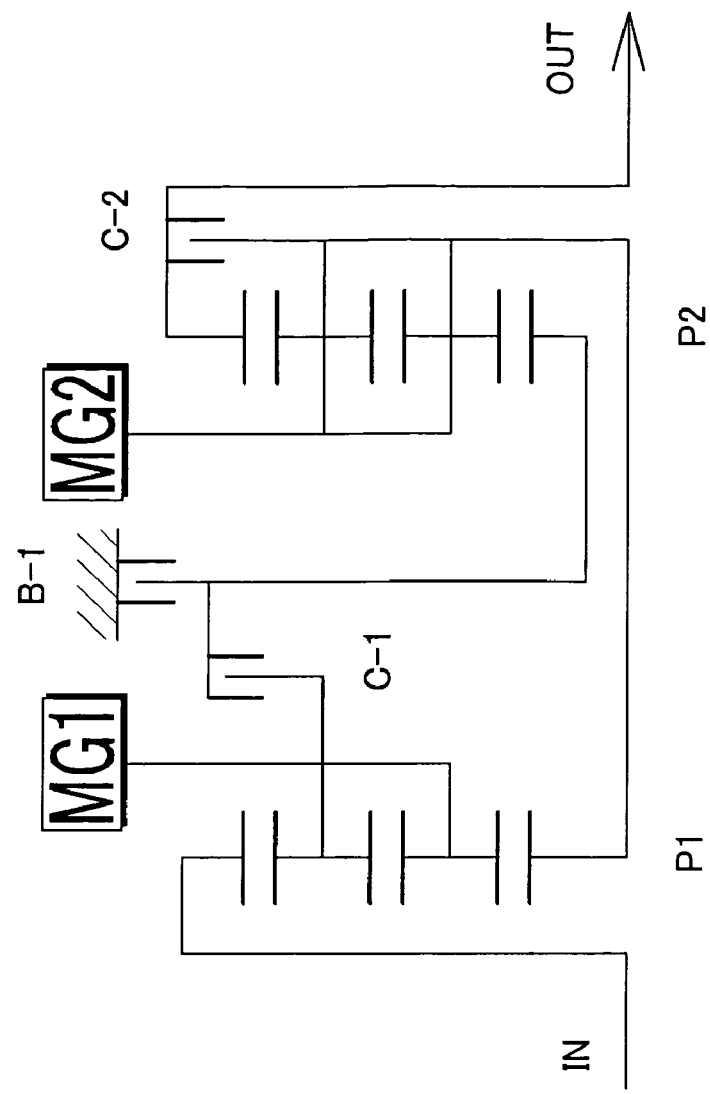

F I G. 7 (C)
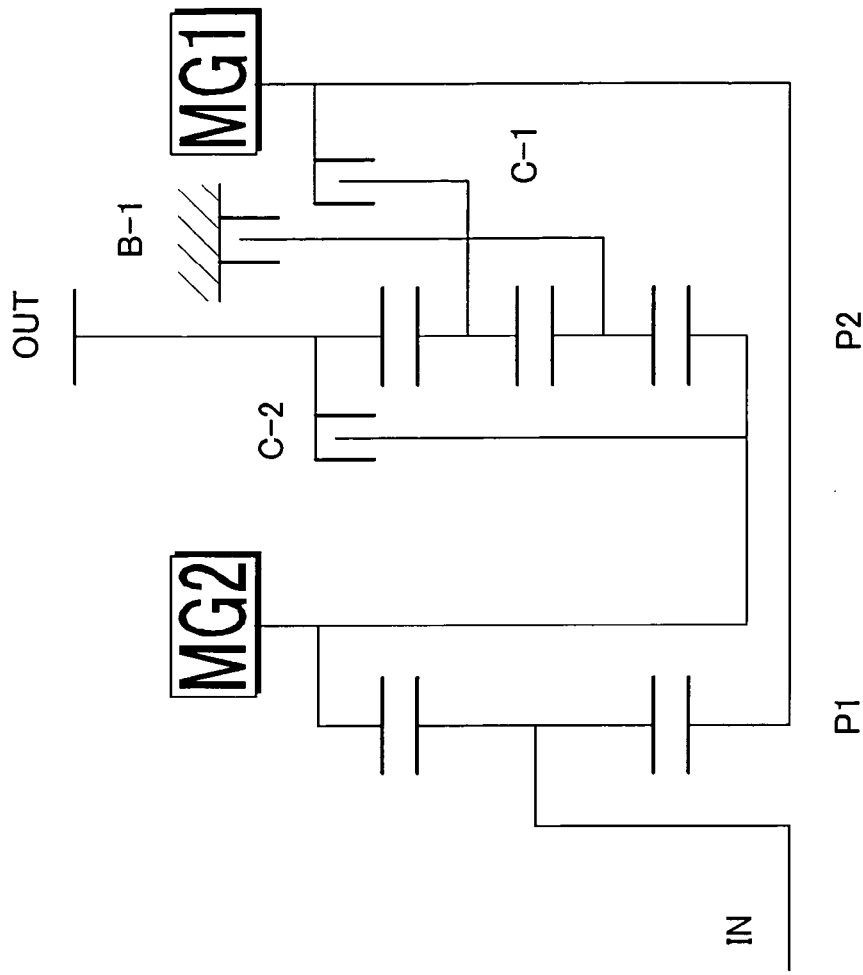
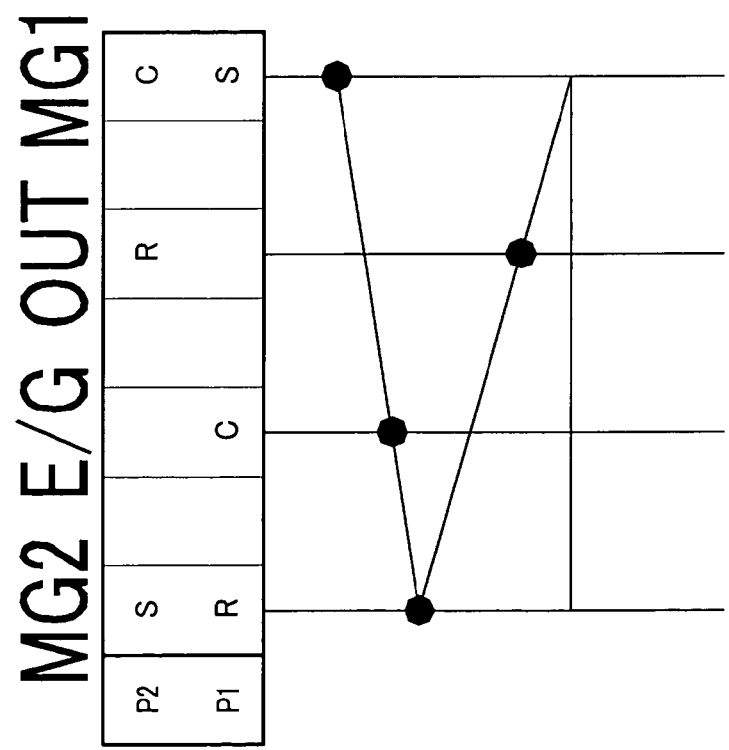

F I G. 7 (D)
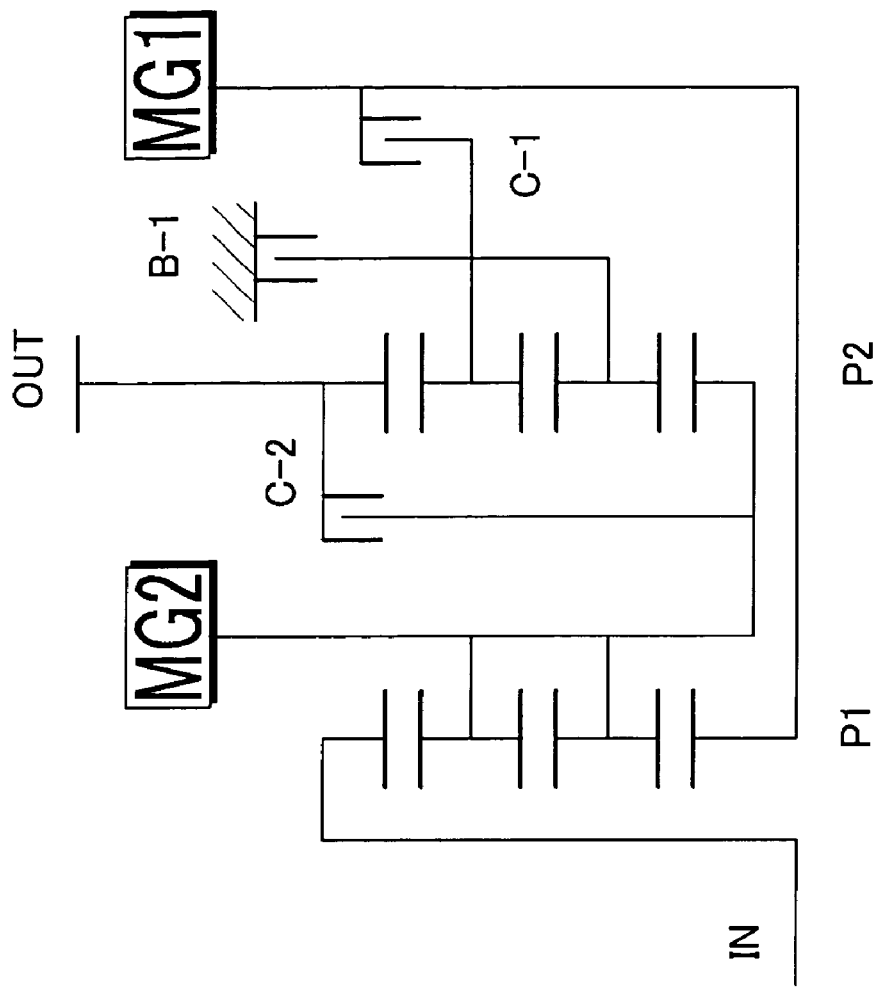
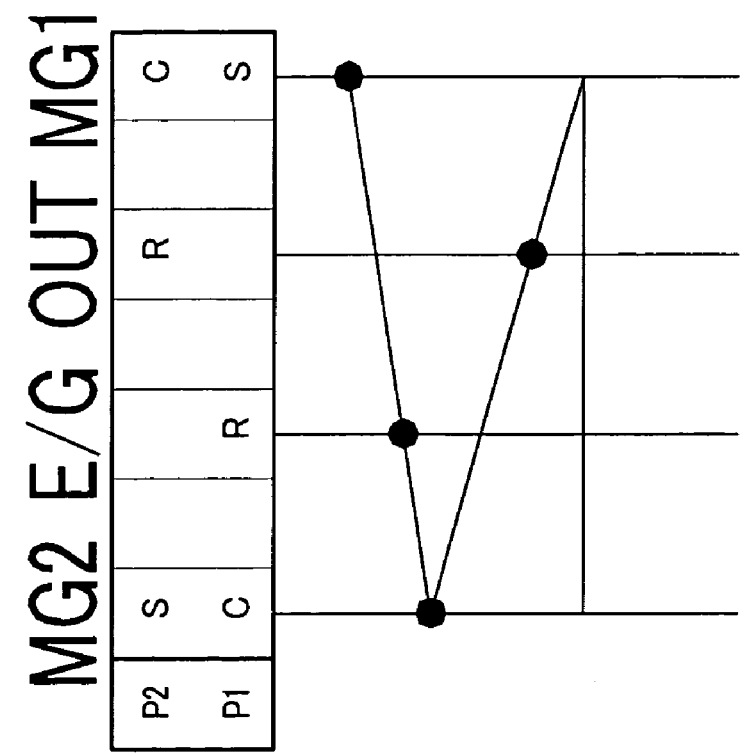

F I G. 10 (A)
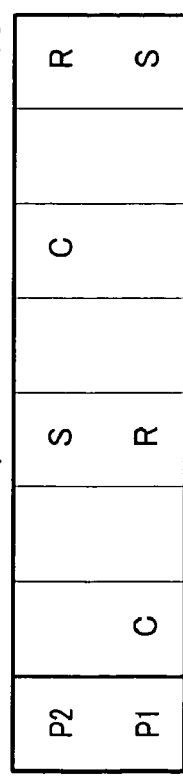
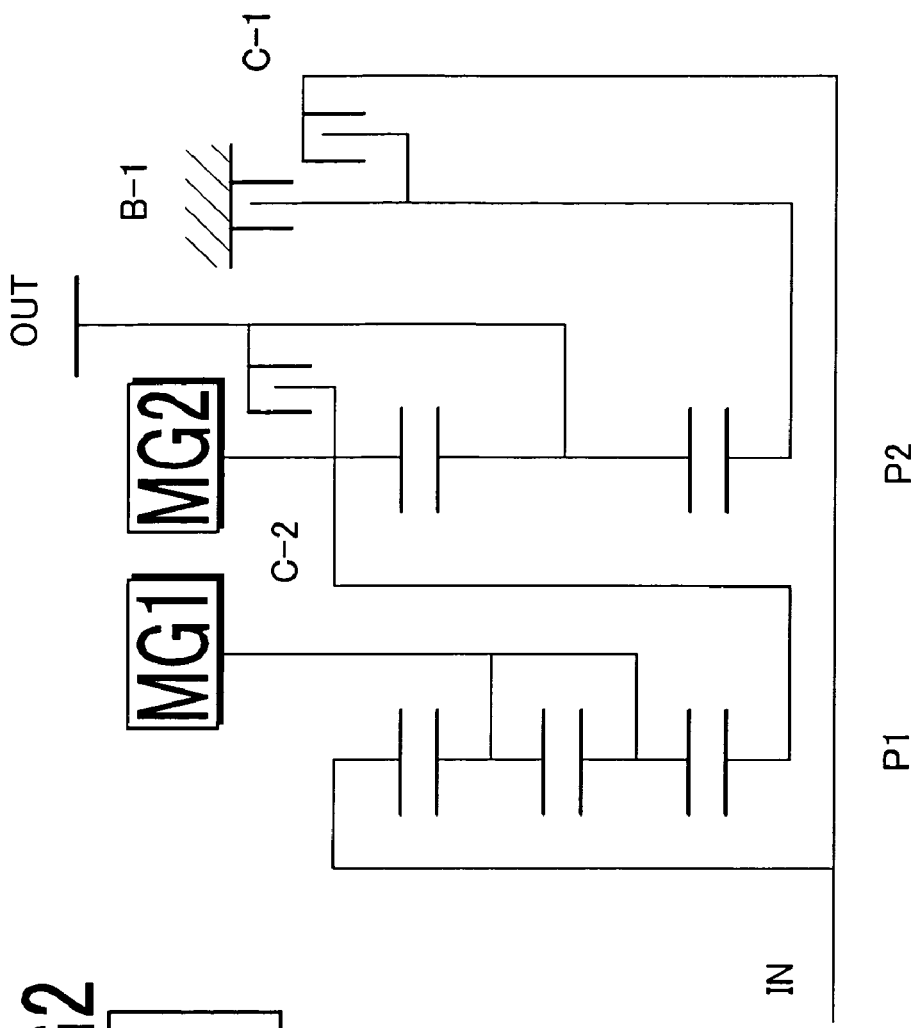

F I G . 10 (C)
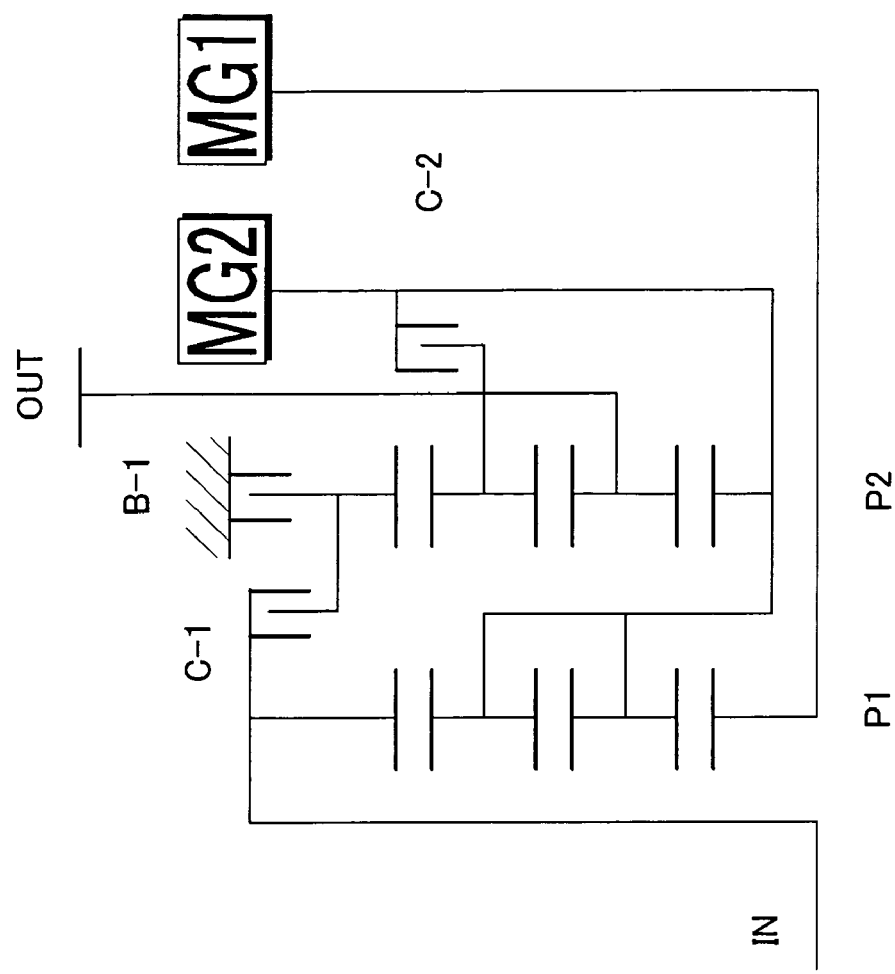
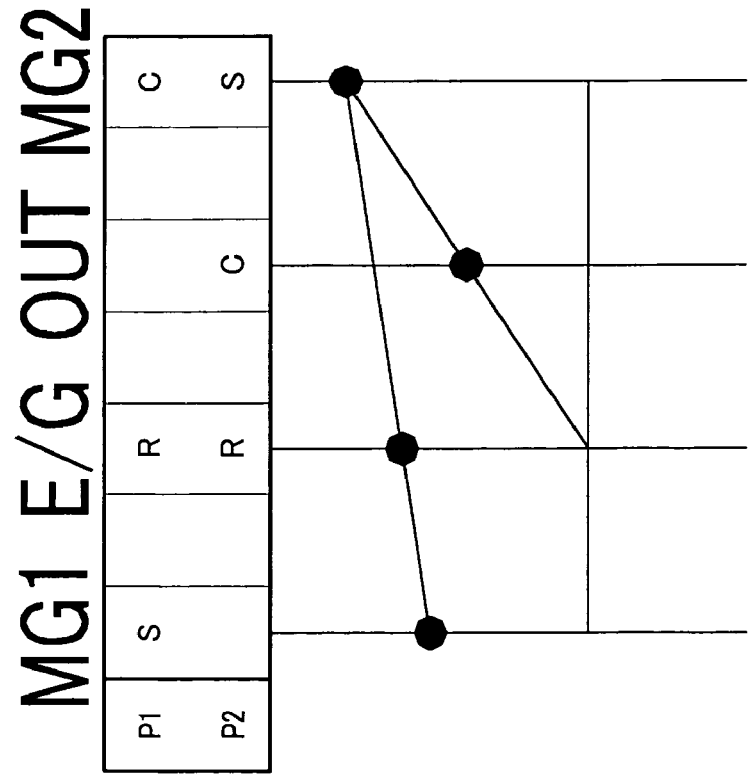

F I G . 10 (F)
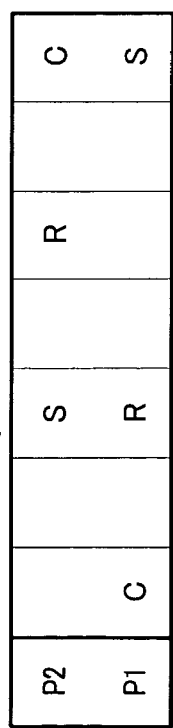
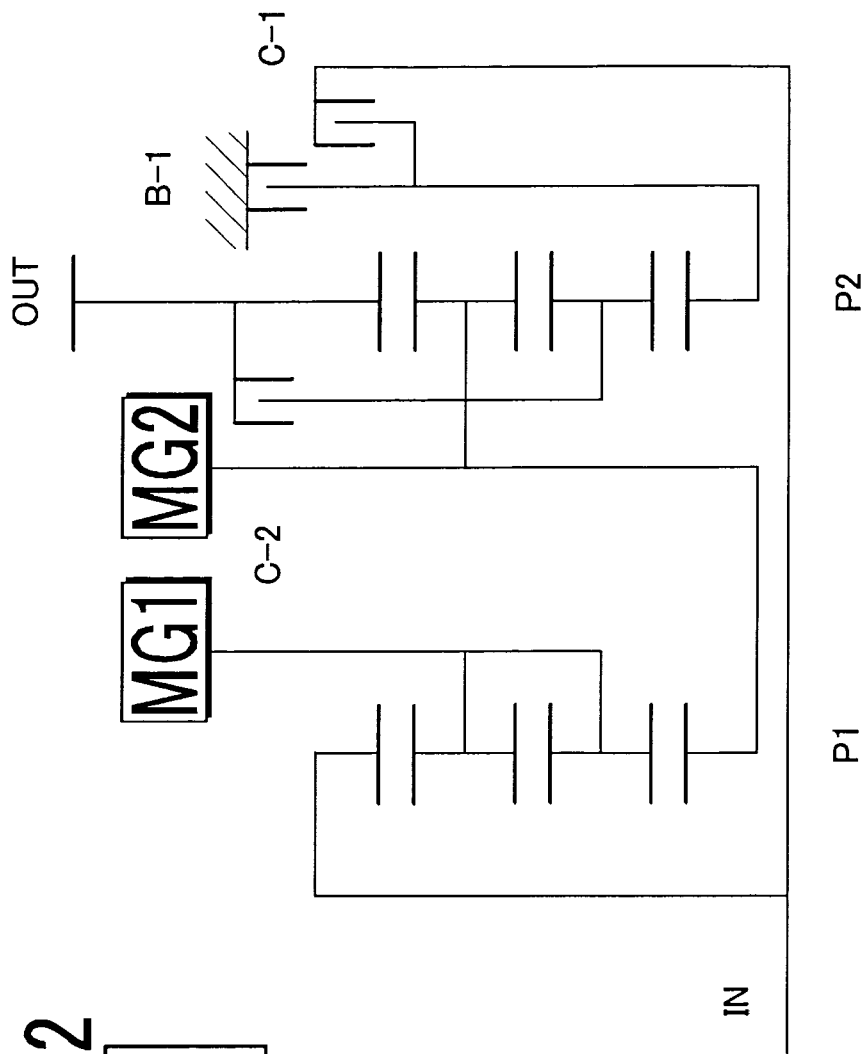

HYBRID DRIVE UNIT

This application claims priority from U.S. Provisional Application No. 60/661,010 filed Mar. 14, 2005 and is related to Japanese Patent Application No. 2003-412630 filed Dec. 10, 2003, the disclosures of both documents being incorporated herein in their entireties by reference thereto.

BACKGROUND

The disclosure relates to a drive unit of a hybrid vehicle. The hybrid vehicle has both an engine (an internal combustion engine) and an electric machine mounted therein. More particularly, the disclosure relates to a drive unit which changes drive modes using two electric machines and two differential gear units.

One example of a drive unit which is connected to an engine and mounted in a hybrid vehicle is a two motor type split hybrid drive unit (see US Patent Application Laid-Open No. 2002-0142876). The hybrid drive unit uses two electric machines (simply referred to in this specification as "motors" or "motor-generators" for the sake of convenience) and two differential gear units, and switches between three and four elements, depending on the running state of the vehicle, by controlling the differential gear units by applying/releasing two of the engagement elements. As a result, the drive unit achieves a three-element reduction mode when the vehicle is run at low speeds, and achieves a four-element direct drive mode when the vehicle is run at high speeds.

With the drive unit in the foregoing publication, however, in the three-element reduction mode (3 Lo), the relationship in which the output Pmg1 of one of the motors that provides motor power cancels out the output Pmg2 of the other motor that receives the reaction force of the output Pmg1, increases and decreases linearly depending on the vehicle speed, as shown by the operating characteristics in FIG. 12. On the other hand, in the four-element direct drive mode (4 Hi), this relationship changes in a curve shape with respect to the vehicle speed. The rate of increase in the output of the motor providing motor power increases as the vehicle speed increases. As used herein the "four-element direct drive mode" refers to the state that the rotational speed of the output member is the same as the rotational speed of the planetary gear element, which is connected to the output member. As used herein the term "three-element direct drive mode" refers to the mode that includes two states that the rotational speed of the output member is the same as the rotational speed of the planetary gear, which is connected to the output member, and the rotational speed of the second electric machine (MG2) is the same as the output member.

SUMMARY

Due to the above-described relationship, the following problems arise in the drive unit of the above publication when in the four-element direct drive mode:

1. During regeneration, one motor is in a regenerating state while the other motor is in a powering state. As a result, power that is equal to, or greater than, the deceleration energy is electrically converted so the energy recovery efficiency deteriorates.

2. In the high vehicle speed/low driving force range (i.e., hereinafter referred to as a negative hybrid range), the electrical conversion ratio increases so the transmission ratio deteriorates.

A hybrid system has two modes; a positive hybrid state and a negative hybrid state. The positive hybrid state is that the motor is connected to the split planetary gear which splits the engine power, generates electrical power for a reaction force of the engine output, and the motor connected to the output member consumes the electrical power. The negative hybrid state is that the motor connected to the split planetary gear which splits the engine power, consumes electrical power for a reaction of the engine output, and the motor connected to the output member generates the electrical power.

The described exemplary embodiments, and variants thereof, aim to solve the foregoing problems by adding a three-element direct drive mode, as an additional mode, to the three-element reduction mode and the four-element direct drive mode by adding one friction engagement element.

The exemplary embodiments provide a hybrid drive unit in which, running in a three-element direct drive mode at high vehicle speeds, not only improves the recovery efficiency of deceleration energy during regeneration, but also improves efficiency in the negative hybrid range. Furthermore, a reduction in output of a first electric machine enables a drive unit to be reduced in size compared to when only two modes, i.e., a three-element reduction mode and a direct drive mode, are available.

BRIEF DESCRIPTION OF THE DRAWINGS

The invention will be described with reference to the drawings, in which:

FIG. 2 is a clutch and brake application chart showing application and release of friction engagement elements used to achieve various modes of the gear train;

DETAILED DESCRIPTION OF EMBODIMENTS

A drive unit according to one application preferably employs a structure in which a gear element of a first differential gear unit, which is coupled to a second electric machine, is coupled, via a first friction engagement element, to a gear element of a second differential gear unit, which is coupled to a third friction engagement element. According to this structure, when switching from a three-element mode to a four-element mode, it is possible to make that mode switch while the rotation speed of the first electric machine is zero. Further, shifting with no rotational difference of the friction element of the friction engagement element to be applied becomes possible during any mode switch, including a switch from the four-element mode to the three-element mode. As a result, shift shock is reduced and the thermal load on the friction element is also reduced.

Figure 1:
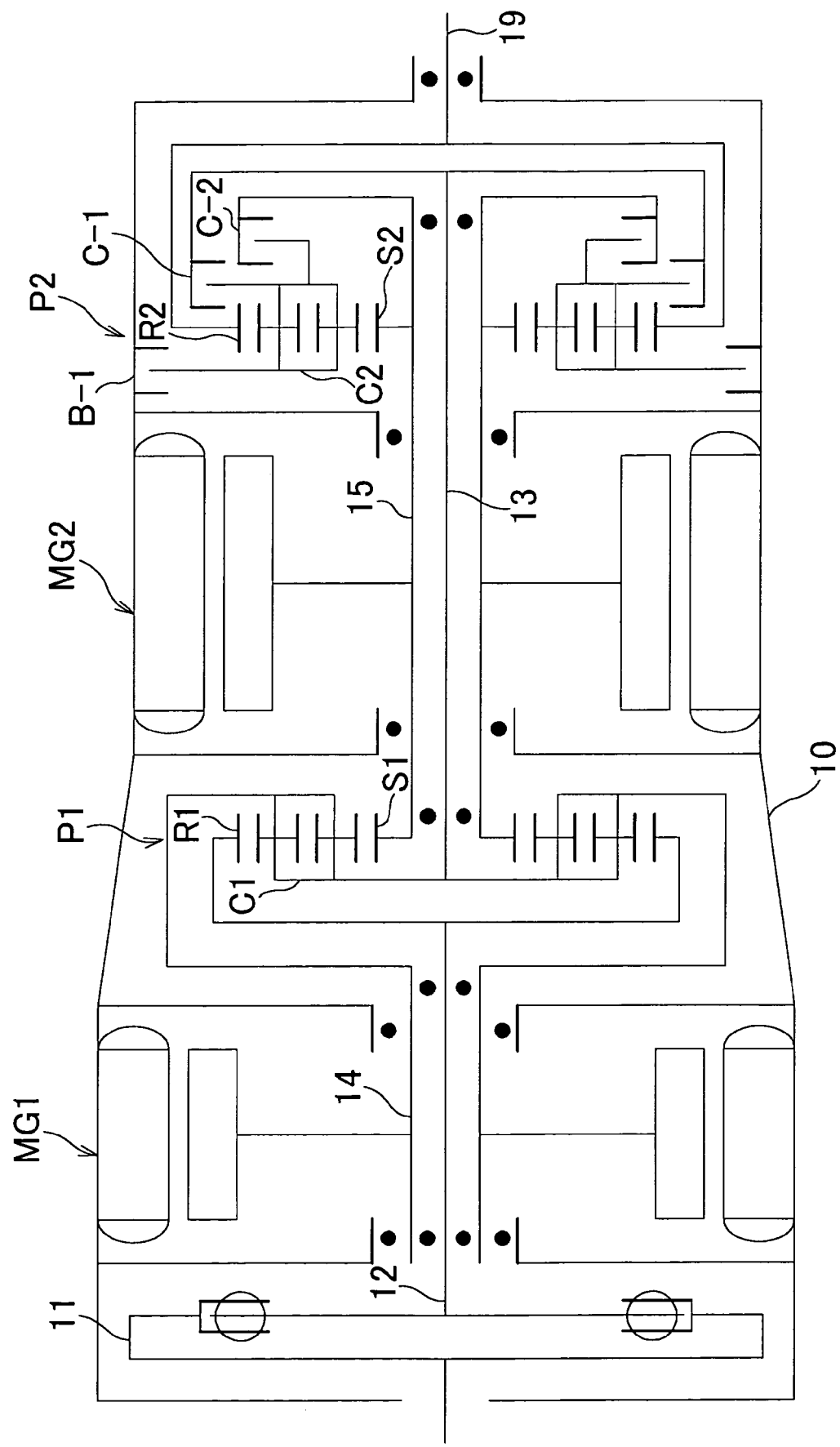
FIG. 1 is a schematic view of a gear train of a drive unit according to one exemplary embodiment.

An exemplary embodiment will hereinafter be described with reference to the appended drawings. FIG. 1 is a schematic view of a gear train of a drive unit according to one application. As shown in the drawing, this drive unit is longitudinally mounted for a front-engine rear-drive vehicle and connected to an engine output shaft via a drive plate 11 having a flywheel damper. The drive unit includes, in the order from the engine connection side and disposed about a single axis in a common drive unit case 10, a motor-generator MG1, a first differential gear unit P1, a motor MG2, and a second differential gear unit P2. Three friction engagement elements, i.e., a brake B-1, a clutch C-1, and another clutch C-2, are disposed adjacent to the second differential gear unit P2.

In this gear train, an input shaft 12 is used as an input member that receives a driving force from the engine, an output shaft 19 is used as an output member that outputs the driving force to a wheel, the motor-generator MG1 is used as a first electric machine, the motor MG2 is used as a second electric machine, a double pinion planetary gear (hereinafter referred to in this exemplary embodiment as a "three-element planetary gear") P1 is used as the first differential gear unit which includes at least three gear elements, and a double pinion planetary gear (hereinafter referred to in this exemplary embodiment as a "reduction planetary gear") P2 is used as the second differential gear unit which also includes at least three gear elements.

The three-element planetary gear P1 is arranged such that one of its three gear elements is connected to the input shaft 12, another of its three gear elements is connected to the motor-generator MG1, and another of its three gear elements is connected to the motor MG2. The reduction planetary gear P2 is arranged such that one of its three gear elements is connected to the output shaft 19, another of its three gear elements is coupled to the brake B-1, and another of its three gear elements is coupled to the gear element of the three-element planetary gear P1, which is coupled to the motor MG2. The gear element of the reduction planetary gear P2, which is coupled to the brake B-1, is coupled, via the clutch C-1, to a gear element other than the gear element of the three-element planetary gear P1, which is directly connected to a gear element of the reduction planetary gear P2. Furthermore, two of the gear elements of the reduction planetary gear P2 are coupled together via the clutch C-2.

The three-element planetary gear P1 is made up of gear elements including a sun gear S1, a ring gear R1, and a carrier C1 which rotatably supports intermeshing pinions, one of which is in mesh with the sun gear S1 and the other of which is in mesh with the ring gear R1. The ring gear R1 is connected to the input shaft 12 and acts as an input element. The carrier C1 is one differential rotation element which is connected to both a rotor shaft 14 of the motor-generator MG1 and an intermediate shaft 13, and the sun gear S1 is another differential rotation element which is connected to a rotor shaft 15 of the motor MG2.

The reduction planetary gear P2 is made up of gear elements including a sun gear S2, a ring gear R2, and a carrier C2 which rotatably supports intermeshing pinions, one of which is in mesh with the sun gear S2 and the other of which is in mesh with the ring gear R2. The ring gear R2 is connected to the output shaft 19 and acts as an output element. The sun gear S2 of the reduction planetary gear P2 is coupled both to the sun gear S1 of the three-element planetary gear P1 via the rotor shaft 15 and to the carrier C2 via the clutch C-2. The carrier C2 is connected to the intermediate shaft 13 via the clutch C-1 and can be held to the drive unit case 10 via the brake B-1.

The rotor shaft 14 is a hollow shaft through which runs the input shaft 12. The outer periphery of the rotor shaft 14 is bearing-supported by supports of the drive unit case 10 via a pair of front and rear bearings. Similarly, the rotor shaft 15 is also a hollow shaft through which runs the intermediate shaft 13, and the outer periphery of the rotor shaft 15 is bearing-supported by supports of the drive unit case 10 via a pair of front and rear bearings. Meanwhile, the outer periphery of the input shaft 12 is bearing-supported by the inner periphery of the rotor shaft 14 via a pair of front and rear bearings. Thus, the input shaft 12 is ultimately supported by the supports of the drive case 10 via the rotary shaft 14. Similarly, the outer periphery of the intermediate shaft 13 is bearing-supported by the inner periphery of the rotor shaft 15 via a pair of front and rear bearings. Thus, the input shaft 13 is ultimately supported by the supports of the drive case 10 via the rotary shaft 15. The outer periphery of the output shaft 19 is bearing-supported via bearings by a rear wall of the drive unit case 10. The bearings are indicated by solid circles in FIG. 1.

According to the drive unit of the foregoing structure, the three friction engagement elements make it possible to achieve three modes: a three-element low (Lo) mode by applying the brake B-1, a four-element mode by applying the clutch C-1, and a three-element high (Hi) mode by applying the clutch C-2, as shown in the clutch and brake application chart in FIG. 2. A circle in the chart denotes application and an "X" denotes release. Next, operation in each mode will be described.

(1) Three-Element Lo Mode

Figure 3:
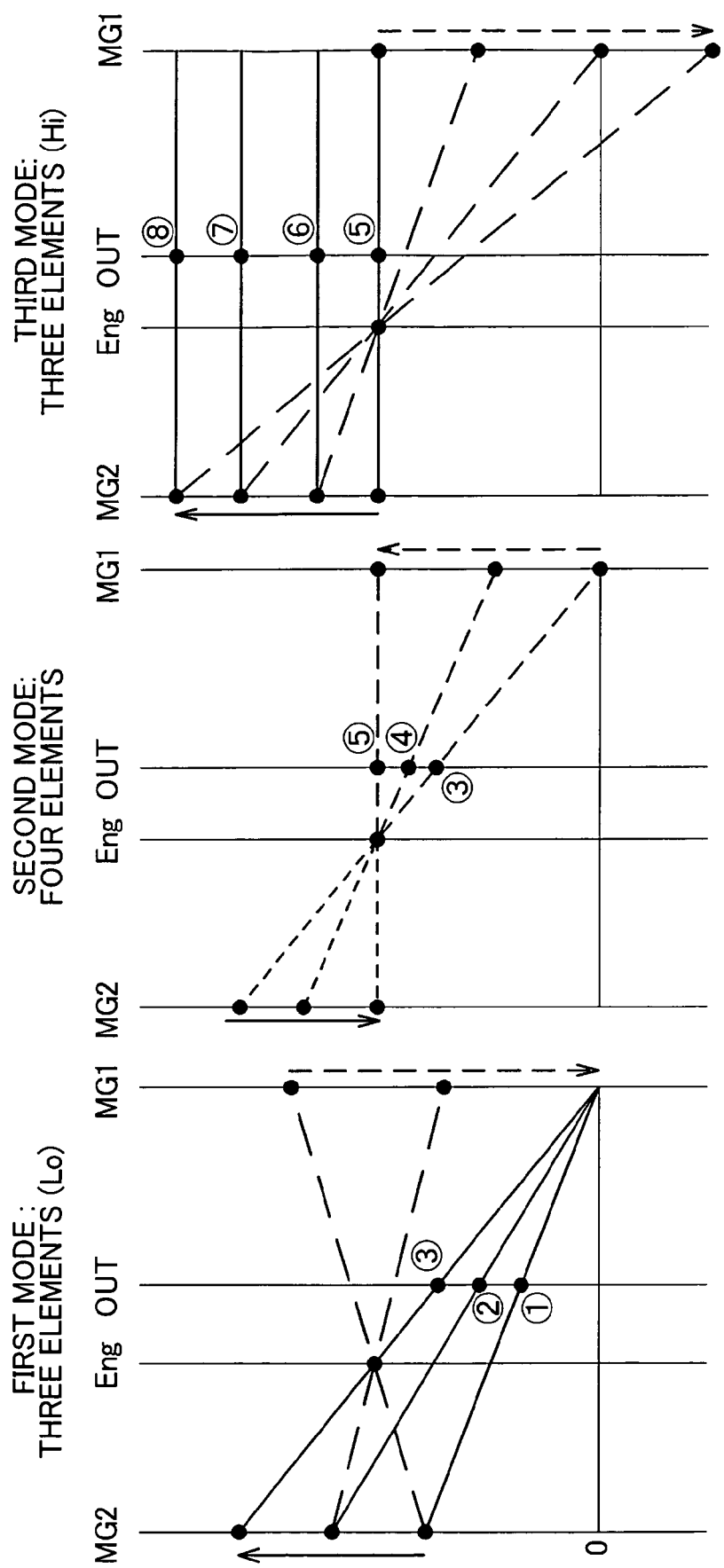
FIG. 3 is a velocity diagram showing operation in the various modes of the gear train.

This mode is used when starting the engine, running with the motor, and accelerating during take-off. It is achieved by applying the brake B-1 such that the carrier C2 of the reduction planetary gear P2 is held to the drive unit case 10. In this mode, the motor MG2 provides motor power which drives the sun gear S2 of the reduction planetary gear P2, and the carrier C2 is held stationary by applying the brake B-1 so that rotation of the ring gear R2 is output to the output shaft 19. At this time, the drive unit is in a state referred to as "First Mode: Three Elements (Lo)" shown on the left side in the velocity diagram in FIG. 3. In this case, when the speed of the engine which is connected to the ring gear is constant and the rotation speed of the motor (i.e., MG2: electric machine on the side from which driving force is output) which is connected to the sun gear is increased (shown by the upward-pointing arrow in the drawing), the rotation speed of the motor-generator (i.e., MG1: the electric machine on the side receiving the reaction torque of the engine) which is connected to the carrier decreases (shown by the downward-pointing broken arrow in the drawing) due to the differential relationship on the three-element planetary gear side. At this time, on the reduction planetary gear side, as the rotation speed of the motor that is connected to the sun gear increases, a decelerated rotation is output from the ring gear due to the reaction force support provided by the carrier being held stationary by application of the brake. Therefore, in this mode the output (OUT) speed continuously increases as the rotation speed of the motor (MG2) increases. The progression of this increase is shown in stages for convenience by encircled numerals 1 to 3 in the drawing. Of these, the output speed denoted by encircled numeral 3 is achieved when the rotation speed of the motor-generator (MG1) has decreased to zero.

(2) Four-Element Mode

This mode is used during normal running. It is achieved by applying the clutch C-1 to couple the carrier C1 of the three-element planetary gear P1 to the carrier C2 of the reduction planetary gear P2 and inputting the differential rotation of the three-element planetary gear P1 to the carrier C2 of the reduction planetary gear P2, as well as inputting the rotation of the motor MG2 to the sun gear S2. In this mode, the rotation speed of the ring gear R2 increases as the rotation speed of the motor-generator (MG1) increases, by reducing the rotation speed of the motor MG2 using the engine speed as a reference, and the rotation of the ring gear R2 is output to the output shaft 19. At this time, the drive unit is in a state referred to as "Second Mode: Four Elements" shown in the middle in the velocity diagram in FIG. 3. In this case, when the engine speed is constant and the rotation speed of the motor (MG2) is reduced to lower than it is in third speed of the prior mode (shown by the downward-pointing arrow in the drawing), the output (OUT) speed continuously increases following an increase (shown by the upward-pointing broken arrow in the drawing) in the rotation speed of the motor-generator (MG1). In this case as well, the progression of the increase is shown in stages by encircled numerals 3 to 5 in the drawing. Of these, the output speed denoted by encircled numeral 5 is achieved when the rotation speeds of the engine (Eng), the motor-generator (MG1), and the motor (MG2) are all the same.

(3) Three-Element Hi Mode

This mode is characteristic and is a mode used when running at a constant speed and during regeneration. In this mode, the clutch C-2 is applied so that the sun gear S2 and the carrier C2 of the reduction planetary gear P2 rotate at the same speed. As a result, the reduction planetary gear P2 locks up, with its three elements rotating together as a single unit. Therefore, when the motor MG2 is used to provide motor power at this time, the rotation output from the ring gear R2 to the output shaft 19 is the same as the rotation of the motor MG2. At this time, the drive unit is in a state referred to as "Third Mode: Three Elements (Hi)" shown on the right in the velocity diagram in FIG. 3. The output (OUT) speed in this case also continuously increases. The progression of this increase is shown in stages by encircled numerals 5 to 8 in the drawing. In this mode, the rotation speed of the motor-generator (MG1) decreases (shown by the downward-pointing broken arrow in the drawing) as the rotation speed of the motor MG2 increases (shown by the upward-pointing arrow in the drawing) due to the differential relationship of the three-element planetary gear, becoming zero at the output speed indicated by encircled numeral 7 and reversing direction at the output speed indicated by encircled numeral 8.

Figure 4:
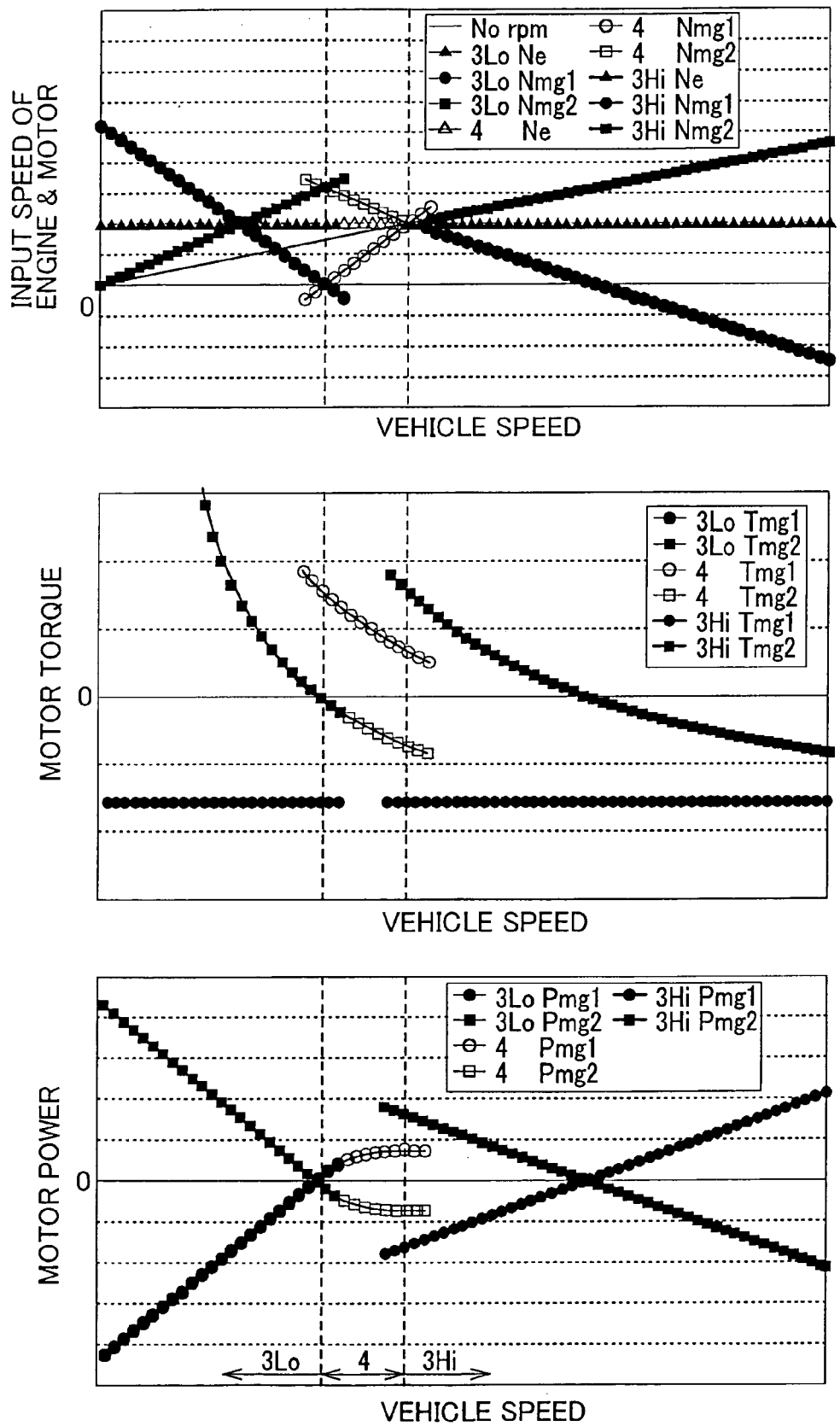
FIG. 4 is a plurality of graphs showing the relationships of input speed, motor torque, and motor output with respect to the vehicle speed of the drive unit.

The relationships of the input speed, motor torque, and motor output with respect to the vehicle speed in the three modes are shown in the graph in FIG. 4. In the first mode (i.e., the three-element Lo mode) shown in the left one of the three regions divided by two vertical dotted lines in the graph, when the engine speed Ne is constant, the rotation speed Nmg2 of the MG2 increases from zero at a constant gradient as the vehicle speed increases until it exceeds the engine speed, due to the above-mentioned relationship. The rotation speed Nmg1 of the MG1, on the other hand, decreases at a constant gradient from a speed higher than the engine speed to a speed lower than the engine speed. From this relationship, the output speed No increases at a constant gradient from zero to near engine speed. Moreover, with regard to the motor torque, the torque Tmg2 of the MG2 decreases at an increasingly slower rate as the vehicle speed increases. In contrast, the torque Tmg1 of the MG1 is maintained at a constant value. With regard to motor output, the output Pmg2 of the MG2 decreases to zero at a constant gradient as the vehicle speed increases. The output Pmg1 of the MG1, on the other hand, increases to zero at a constant gradient as the vehicle speed increases.

Also, in the second mode (i.e., the four-element mode) shown in the middle one of the three regions between the two vertical dotted lines in the graph, similarly, when the engine speed Ne is constant, the rotation speed Nmg2 of the MG2 decreases from a given value at a constant gradient as the vehicle speed increases, and eventually becomes the same speed as the engine speed. The rotation speed Nmg1 of the MG1, on the other hand, increases at a constant gradient from a speed lower than the engine speed to the same speed as the engine speed. Moreover, with regard to the motor torque, the torque Tmg2 of the MG2 decreases at an increasingly slower rate as the vehicle speed increases. In contrast, the torque Tmg1 of the MG1 tends to decrease just like the torque Tmg2 of the MG2, but at a higher value than that of the torque Tmg2. With regard to motor output, the output Pmg1 of the MG1 increases at an increasingly slower rate as the vehicle speed increases. Conversely, the output Pmg2 of the MG2 decreases at an increasingly slower rate as the vehicle speed increases.

Furthermore, in the third mode (i.e., the three-element Hi mode) shown in the right one of the three regions divided by the two vertical dotted lines in the graph, similarly, when the engine speed Ne is constant, the rotation speed Nmg2 of the MG2 increases from the engine speed at a constant gradient as the vehicle speed increases. In contrast, the rotation speed Nmg1 of the MG1 decreases from the engine speed at a constant gradient. With regard to motor torque, the torque Tmg2 of the MG2 decreases at an increasingly slower rate as the vehicle speed increases, while the torque Tmg1 of the MG1 remains constant. With regard to motor output, the output Pmg2 of the MG2 decreases from a given value at a constant gradient as the vehicle speed increases, and eventually passes zero, after which it is in a regenerative region (i.e., after which the MG2 is in a regenerating state). The output Pmg1 of the MG1, on the other hand, increases from a given value in the regenerative region at a constant gradient as the vehicle speed increases, and eventually passes zero, after which it is in a powering region (i.e., after which the MG1 is in a powering state).

(4) Mode Switching

Figure 5:
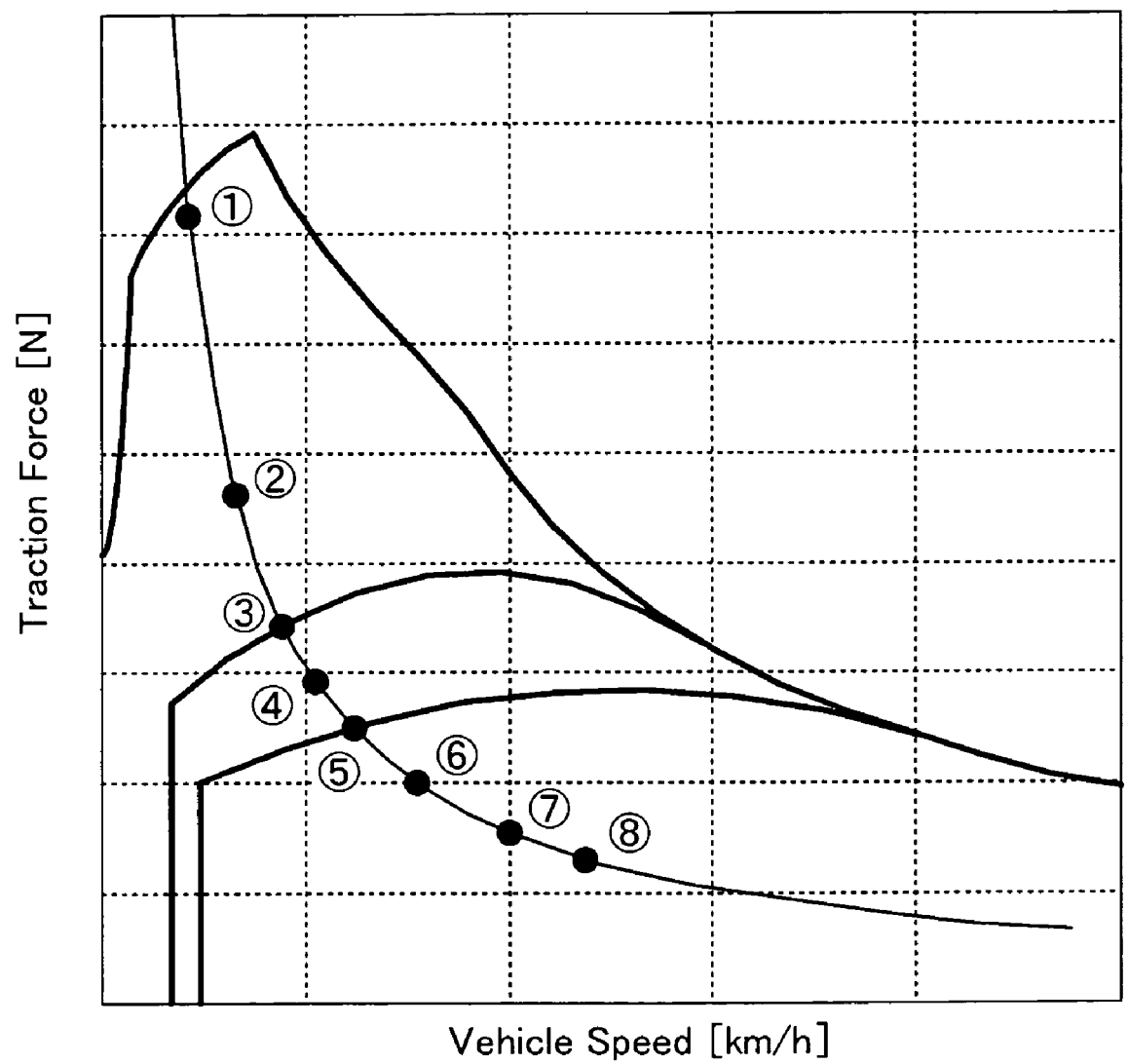
FIG. 5 is a map showing mode switches.

Switching of the modes is performed as shown in the switching map in FIG. 5. This switching map indicates the switching points, with the horizontal axis representing the vehicle speed and the vertical axis representing the driving force. As shown in the drawing, when accelerating during take-off, the three-element Lo mode is used to achieve a low speed/high torque state. When the desired driving force is small, the drive unit is switched early on at a low speed into the four-element mode and the three-element Hi mode, as is shown by the switching points with the bold solid lines in the drawing. As the desired driving torque increases, the switching point is shifted toward the high speed side. The thin line in the drawing shows a typical shift progression. As is shown by relating the output speeds in this progression to the speeds shown in FIG. 3, the region including output speeds 1 to 3 is the three-element Lo mode region, the region including output speeds 3 to 5 is the four-element mode region, and the region including output speeds 5 to 8 is the three-element Hi mode region. Mode switching is performed at output speeds 3 and 5. When switching from the three-element Lo mode to the four-element mode in this case, a so-called change over of friction engagement elements is performed, in which the brake B-1 is released while the clutch C-1 is applied. At this time, as is evident from the speed changes shown in FIG. 3 and the characteristics graph in FIG. 4, the rotation speed of the motor-generator MG1 is zero, and the rotation speeds of both the intermediate shaft 13 and the carrier C2, which is held stationary by application of the brake B-1 in the three-element Lo mode, are also zero, so the clutch C-1 which couples these two together is applied while they are stationary. Therefore, using this characteristic, a change over when there is no rotational difference of the clutch friction member is possible, which reduces shift shock as well as the thermal load on the friction members. Next, when switching from the four-element mode (4) to the three-element Hi mode (3 Hi), the output speed No, the engine speed Ne, the MG1 rotation speed Nmg1, and the MG2 rotation speed Nmg2 are all the same, as is evident from the characteristics graph in FIG. 4. This switch is performed by a so-called clutch-to-clutch change over, in which the clutch C-1 is released and the clutch C-2 is applied. Using this characteristic, a change over when there is no rotational difference between the clutch friction members is possible. As a result, in this case as well, both shift shock and the thermal load on the friction members can be reduced.

As described in detail above, in this exemplary embodiment, it is possible to couple two gear elements of the reduction planetary gear P2 together by applying the clutch C-2, and thereby lock up the reduction planetary gear P2. As a result of this lock up, the recovery efficiency of deceleration energy during regeneration can be improved, as is the efficiency in the negative hybrid region, by running in a three-element direct drive mode when running at high vehicle speeds. In addition, the motor output required for powering is reduced compared with a case in which only two modes, i.e., the three-element reduction mode and the direct drive mode of the related art, are available, which enables the motor to be made smaller. Further, when switching from the three-element Lo mode to the four-element mode and from the four-element mode to the three-element Hi mode, the shifts can be made while there is no differential rotation of the clutches. As a result, both shift shock and the thermal load on the friction elements are reduced.

Figure 6:
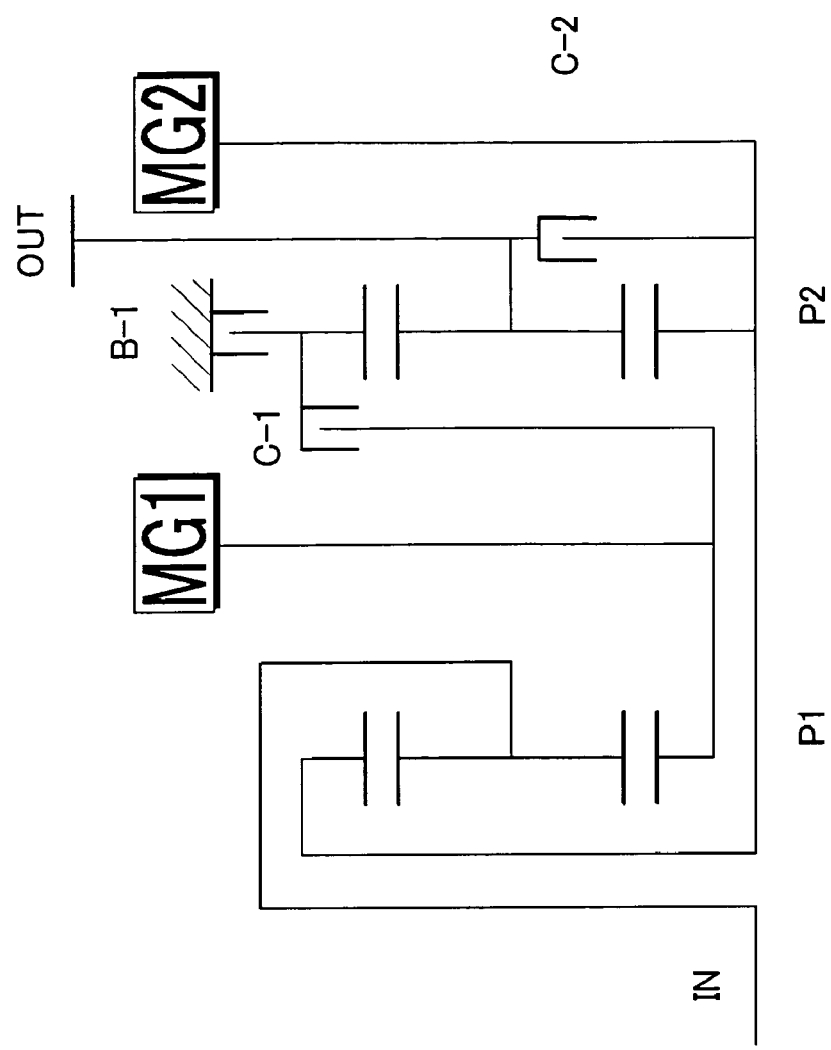
FIGS. 6A-6(F) are explanatory views showing a series of gear trains according to another exemplary embodiment and the connective relationships between each of their structural elements, together with velocity diagrams showing their operation.
Figure 6:
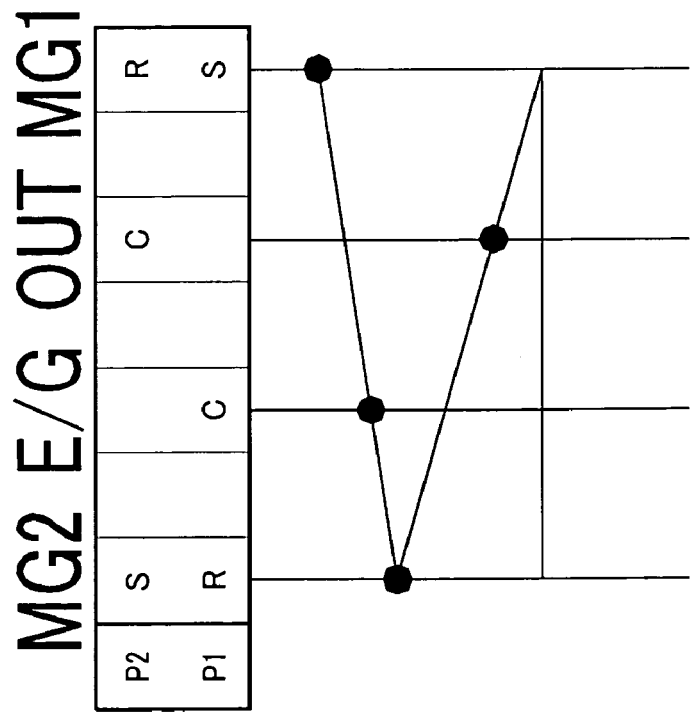
Figure 6:
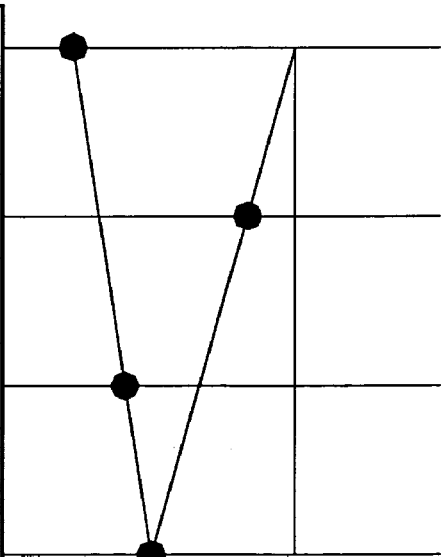
Figure 7:
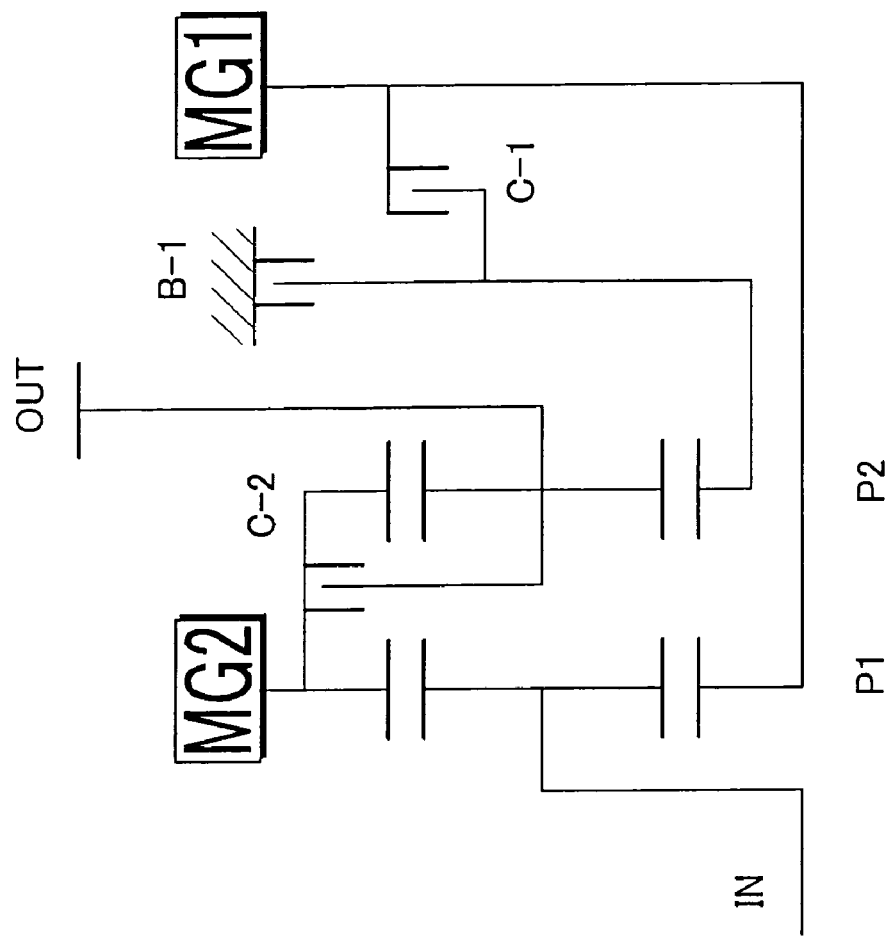
FIGS. 7(A)-7(E) are explanatory views showing another series of gear trains and the connective relationships between each of their structural elements, together with velocity diagrams showing their operation.
Figure 7:
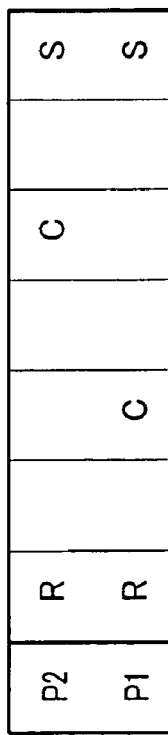
Figure 8:
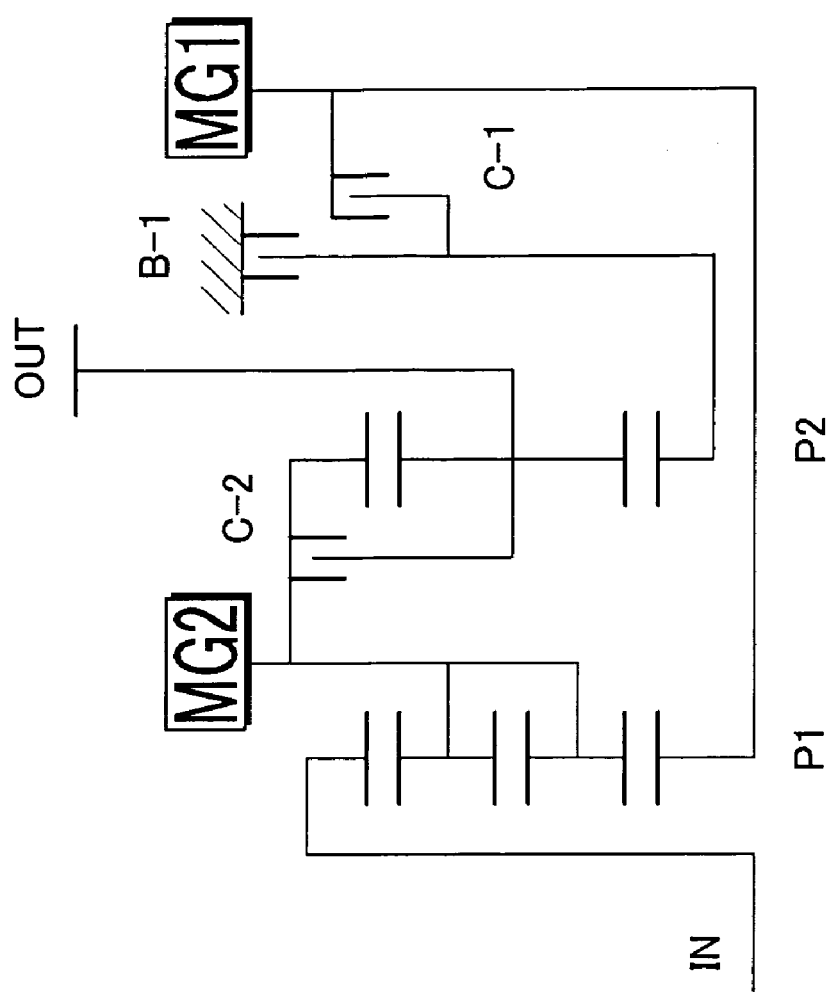
FIGS. 8(A)-8(C) are explanatory views showing still another series of gear trains and the connective relationships between each of their structural elements, together with velocity diagrams showing their operation.
Figure 8:
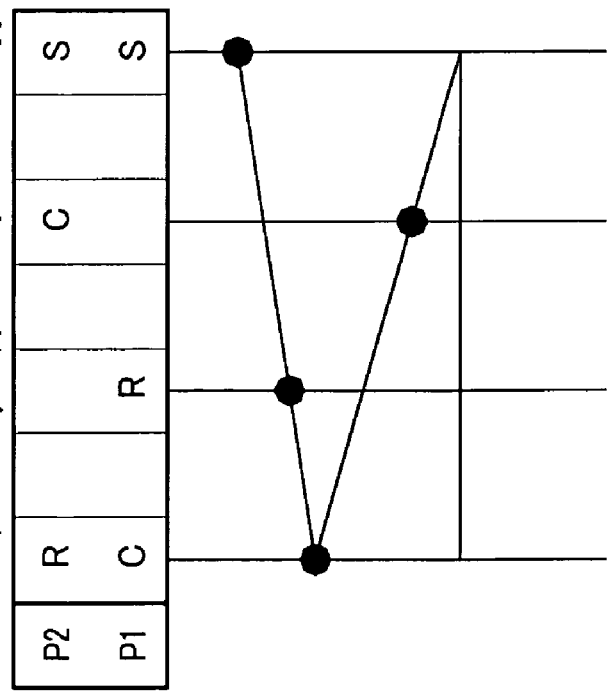
Figure 8:
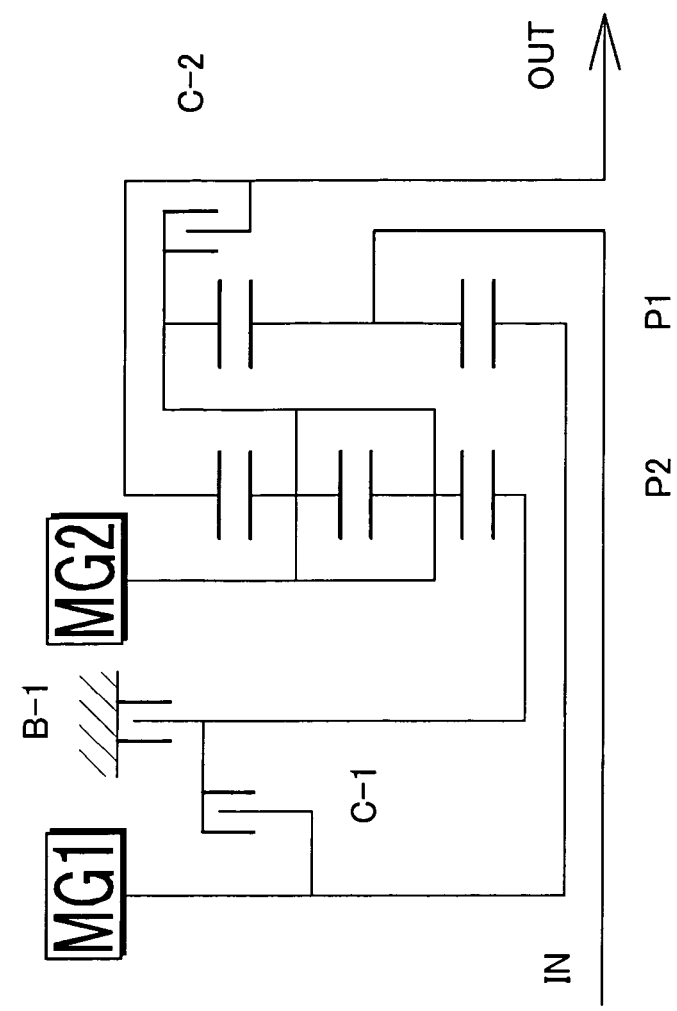
Figure 8:
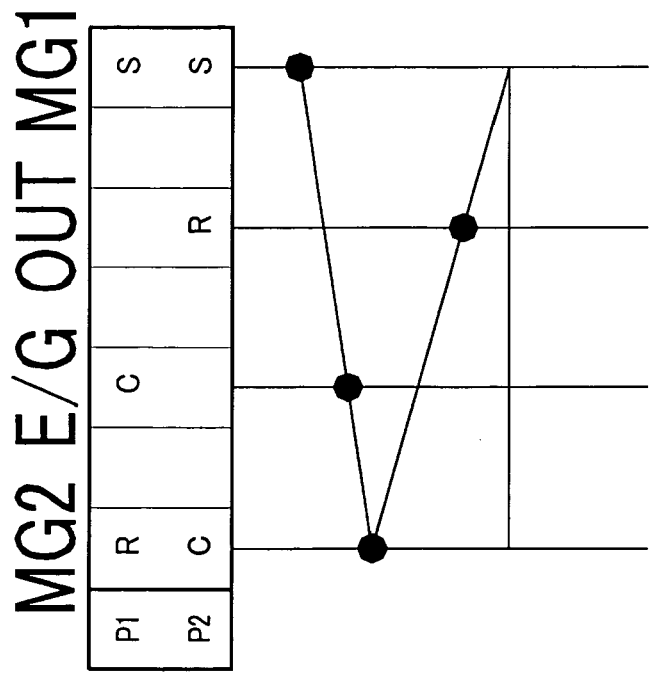
Figure 9:
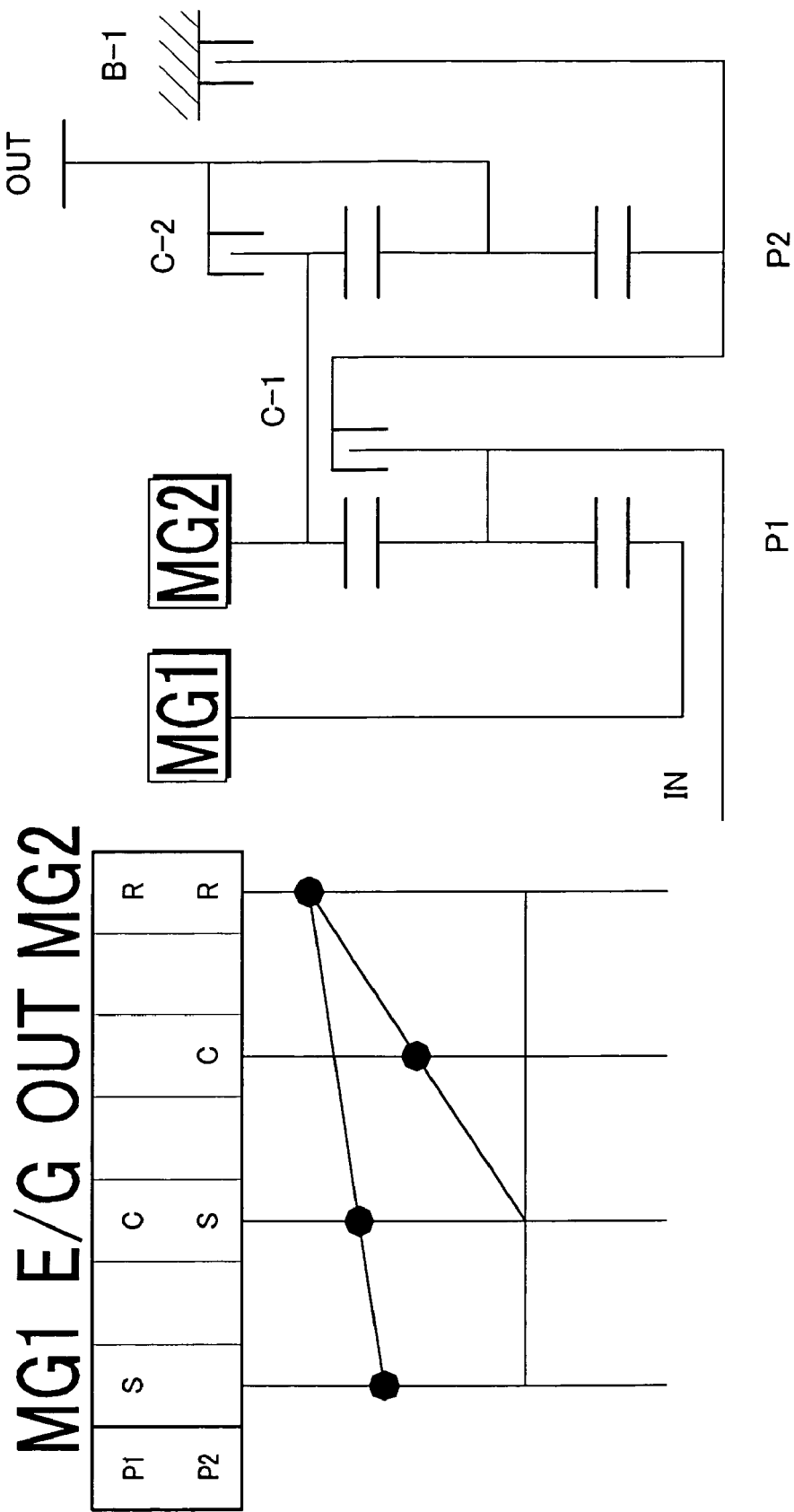
FIGS. 9(A)-9(F) are explanatory views showing a series of gear trains of a different type and the connective relationships between each of their structural elements, together with velocity diagrams showing their operation.
Figure 9:
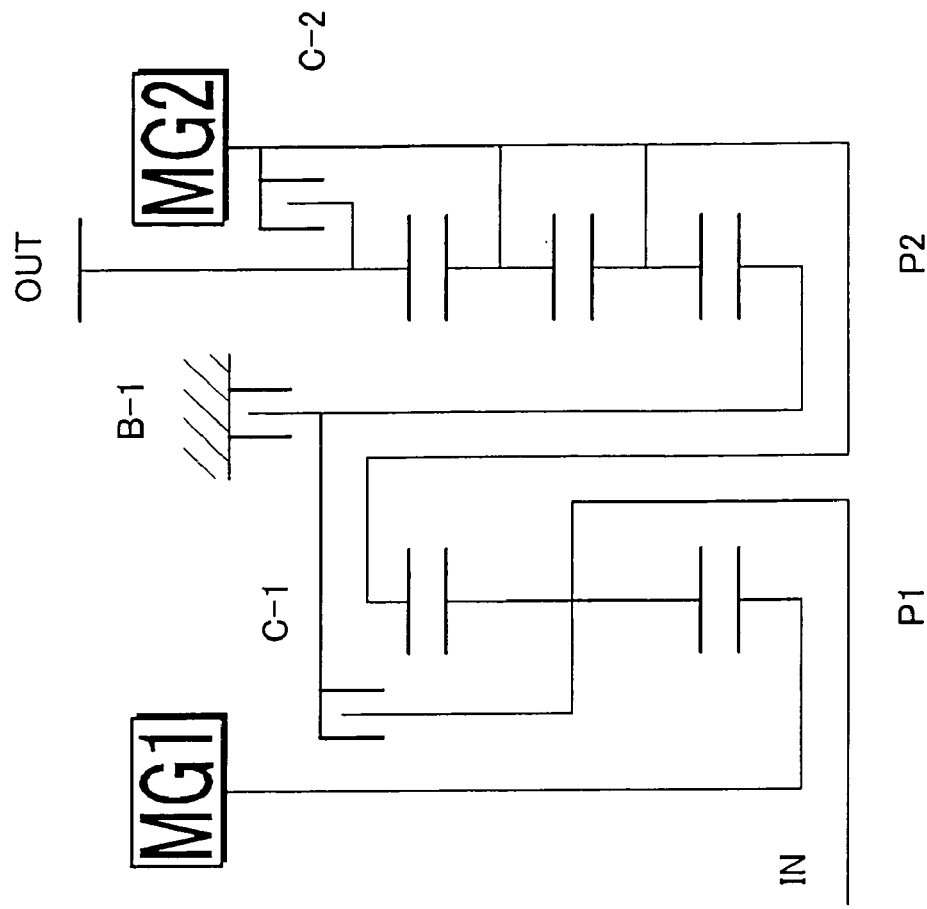
Figure 9:
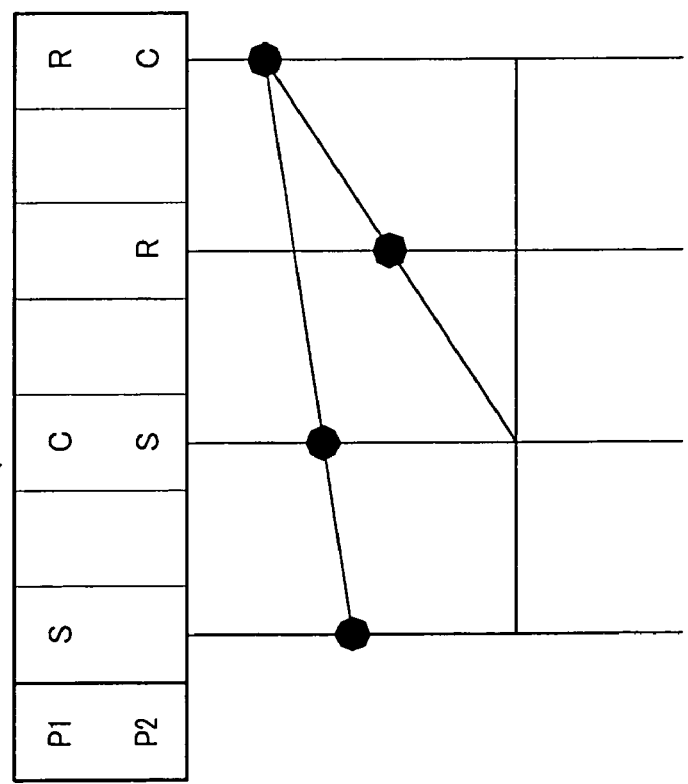
Figure 9:
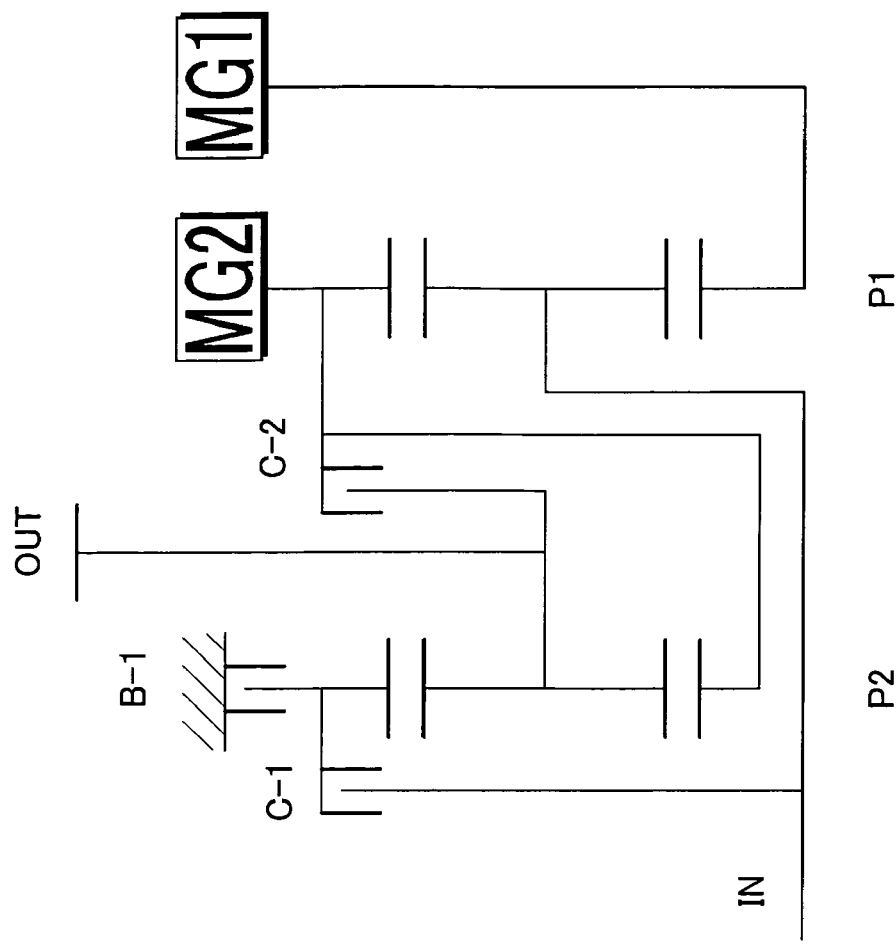
Figure 9:
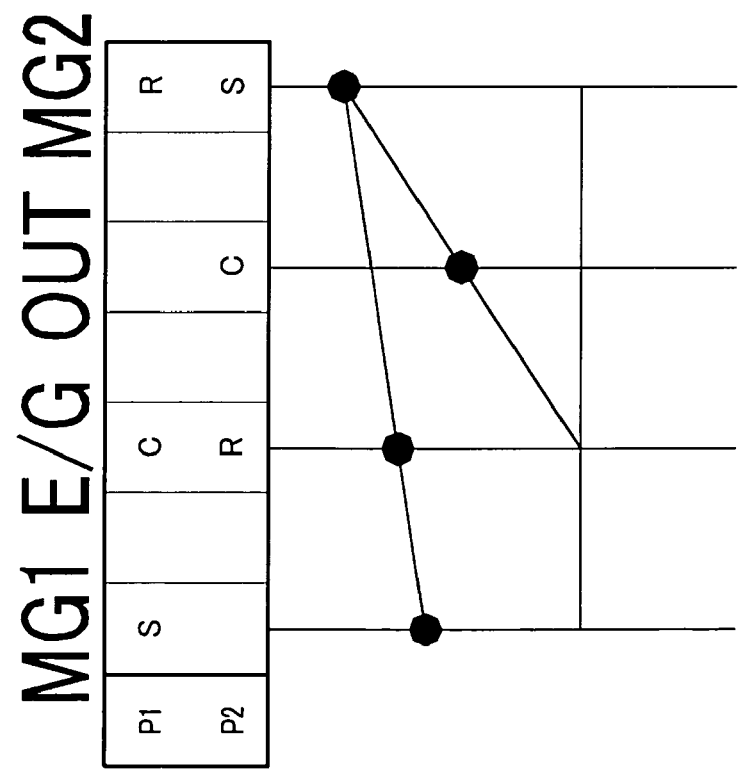
Figure 9:
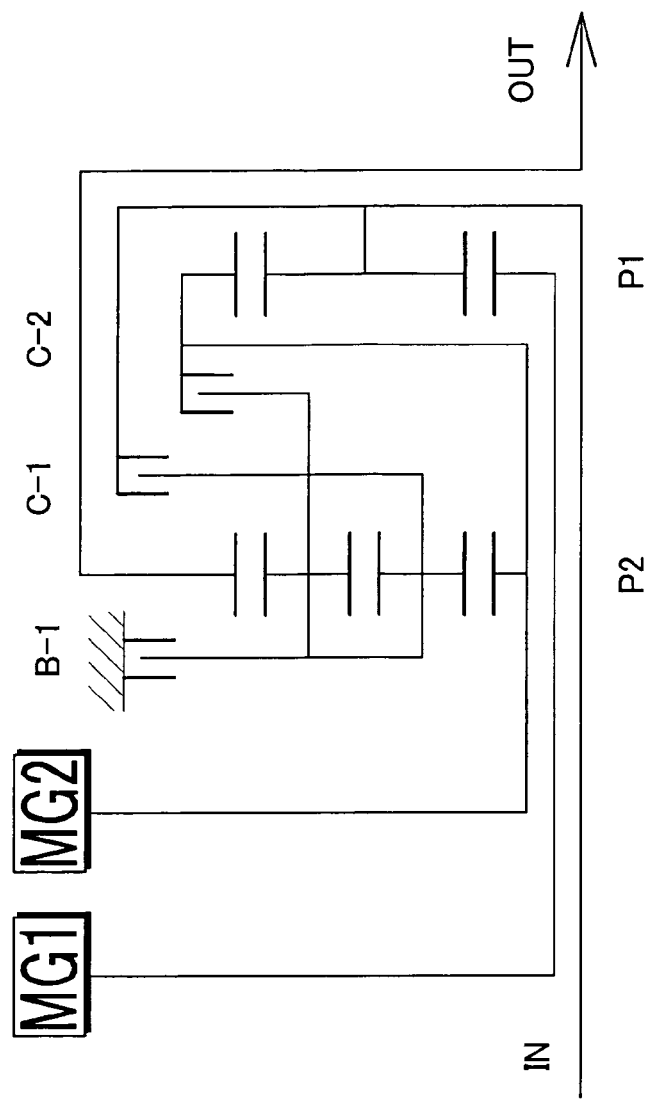
Figure 9:
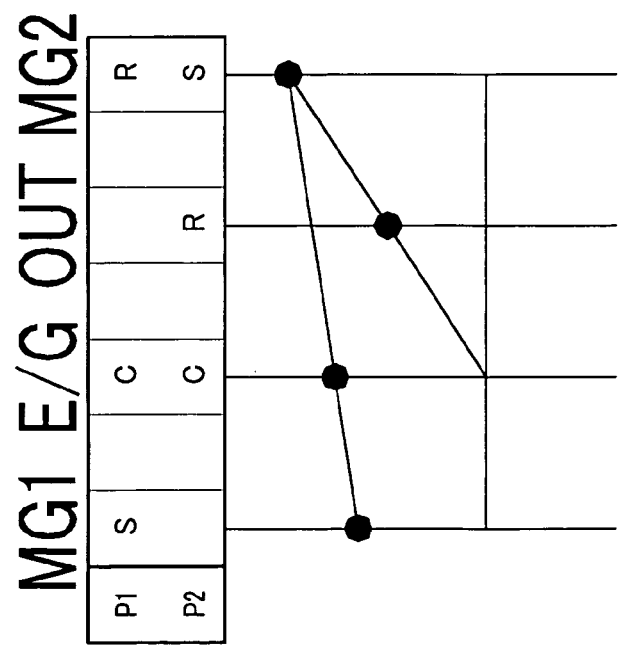
Figure 10:
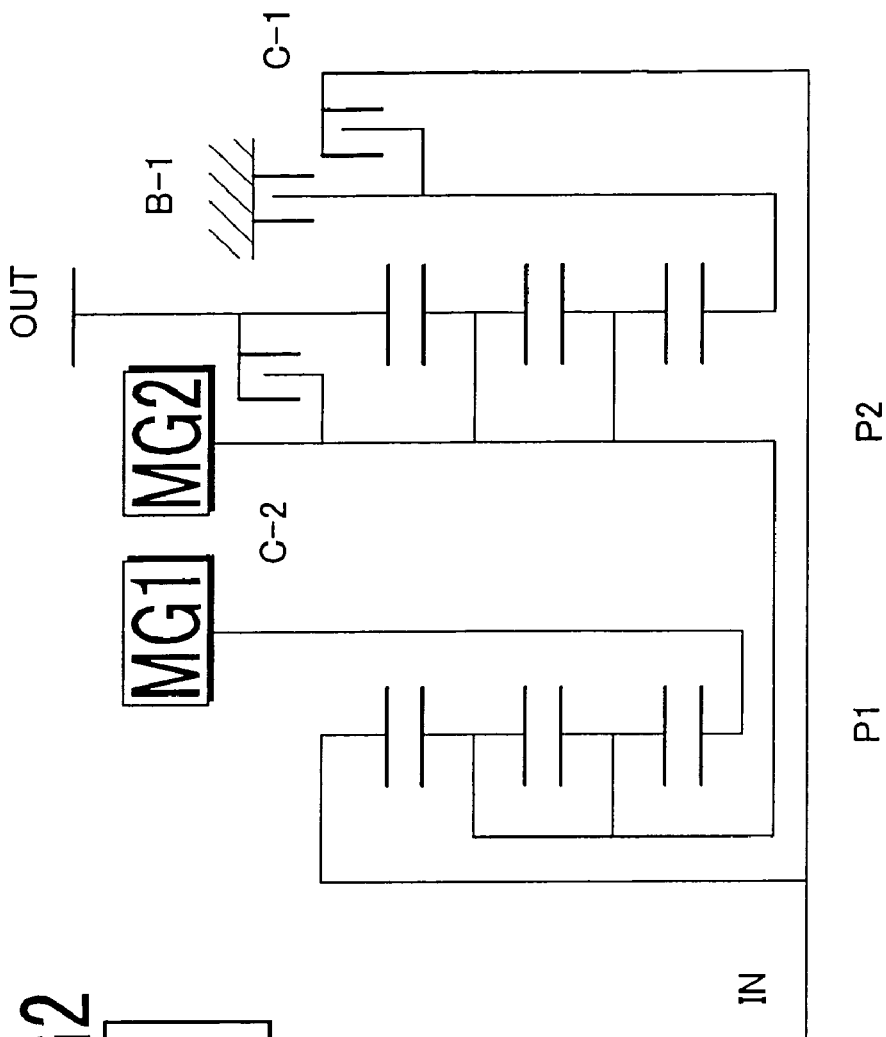
FIGS. 10(A)-10(F) are explanatory views showing another series of gear trains of a different type and the connective relationships between each of their structural elements, together with velocity diagrams showing their operation.
Figure 10:
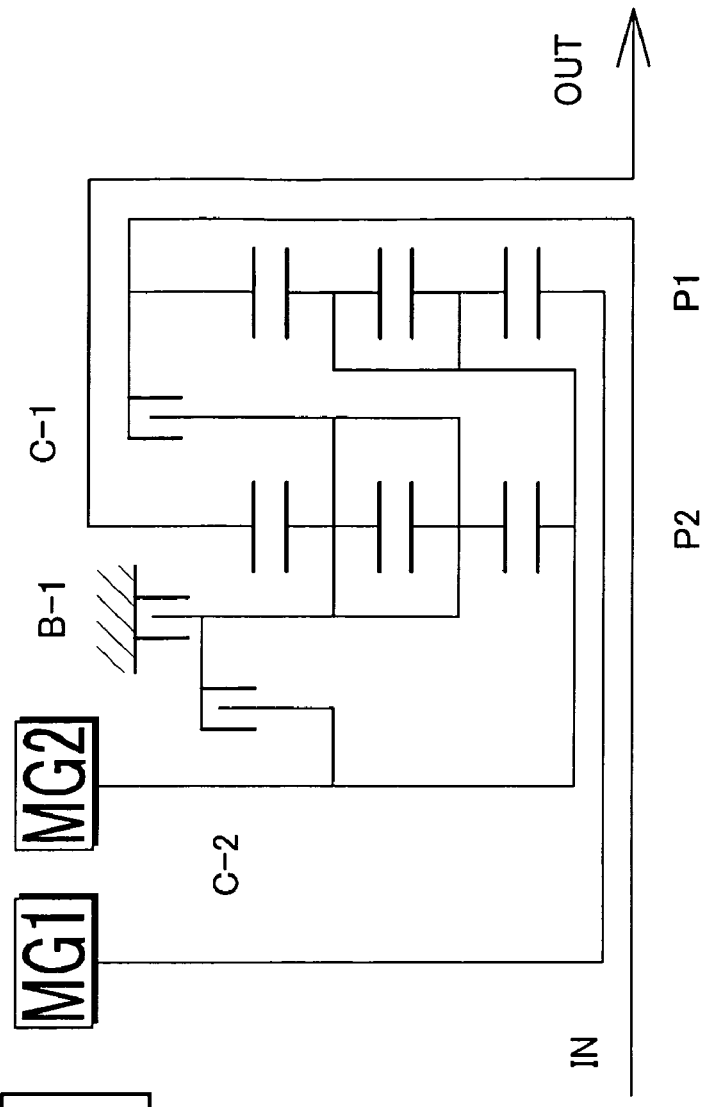
Figure 10:
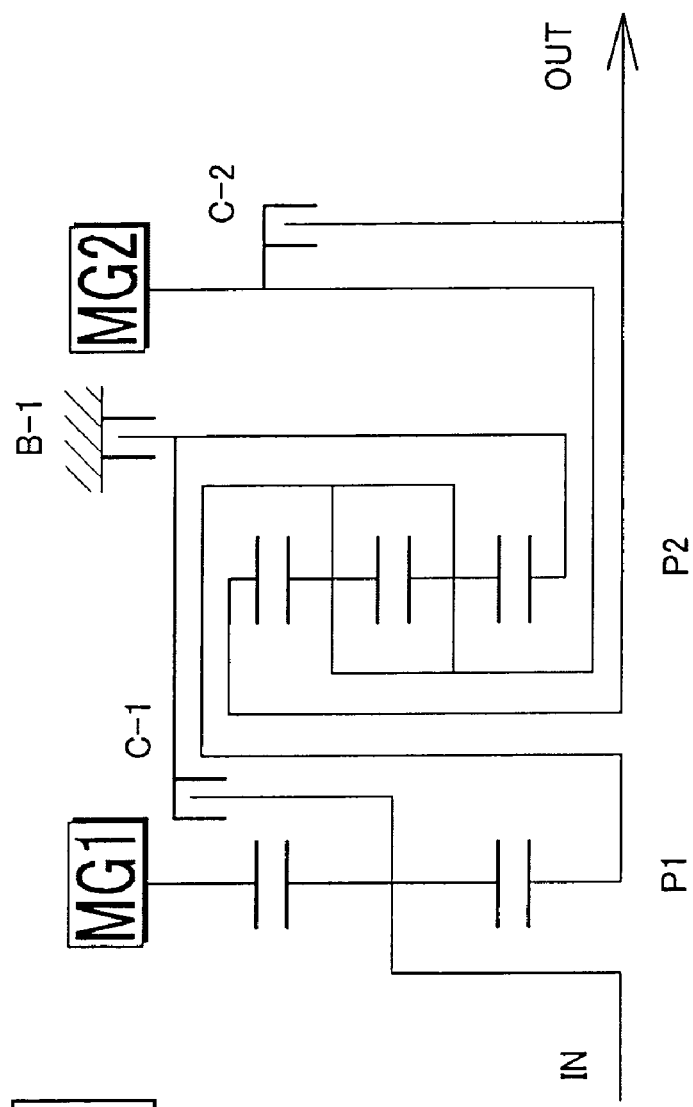
Figure 11:
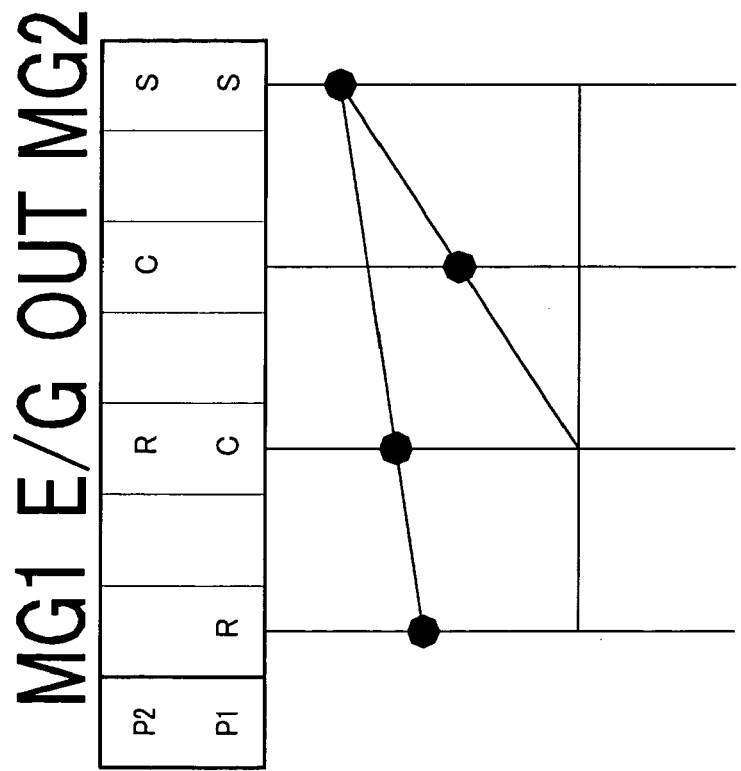
FIGS. 11(A)-11(D) are explanatory views showing still another series of gear trains of a different type and the connective relationships between each of their structural elements, together with velocity diagrams showing their operation.
Figure 11:
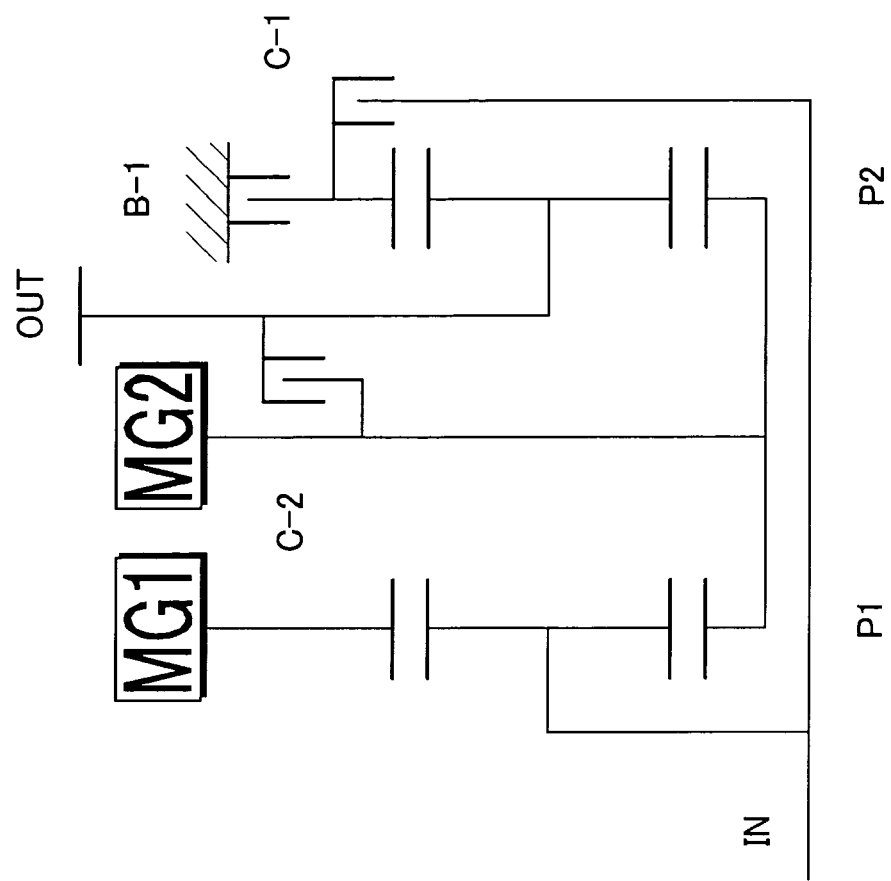
Figure 11:
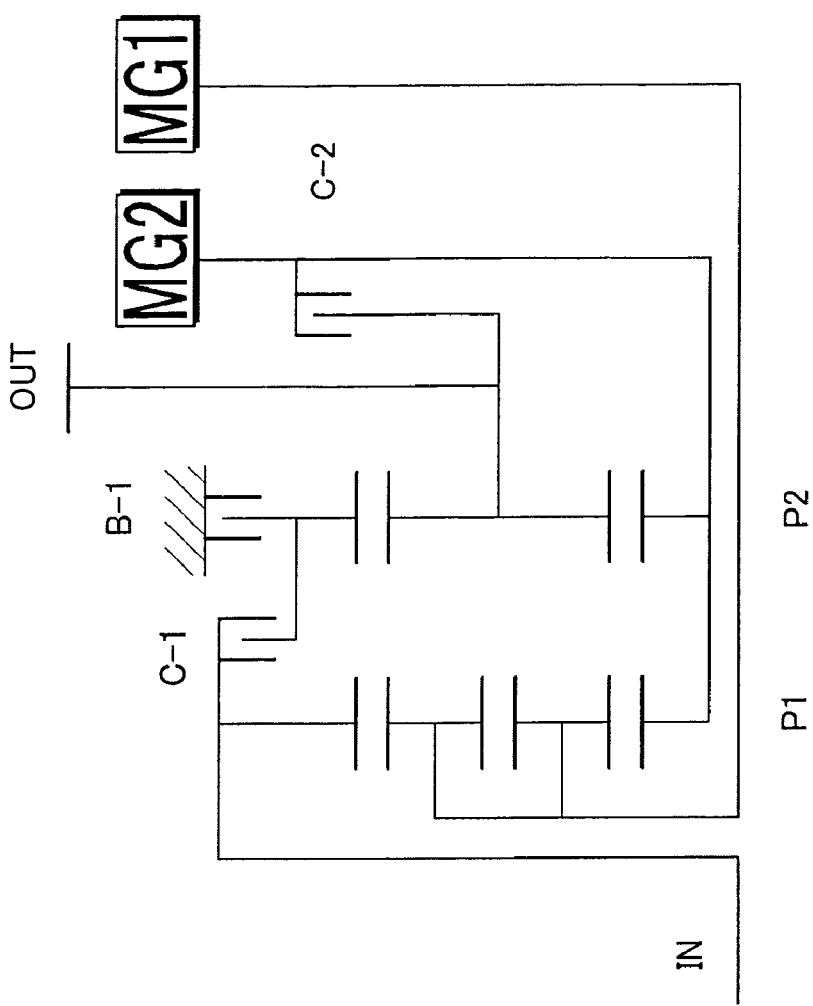
Figure 11:
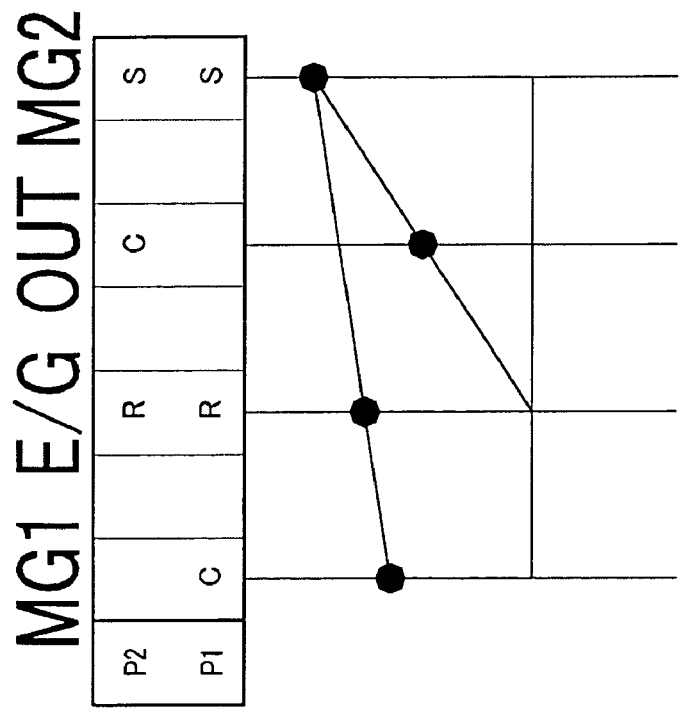
Figure 11:
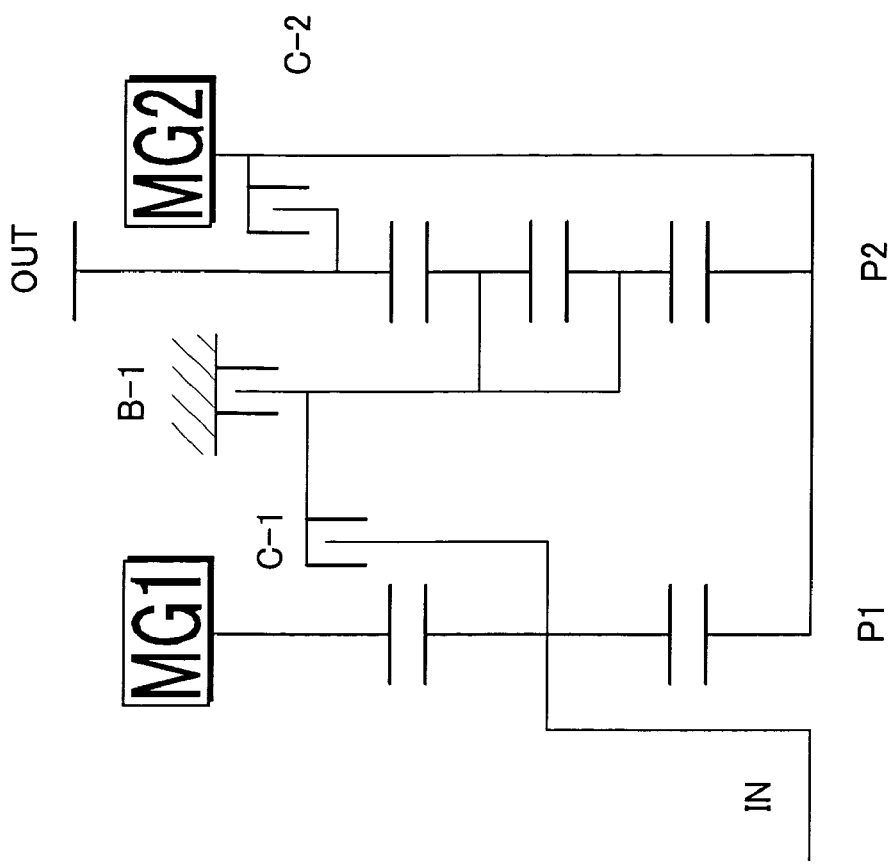
Figure 11:
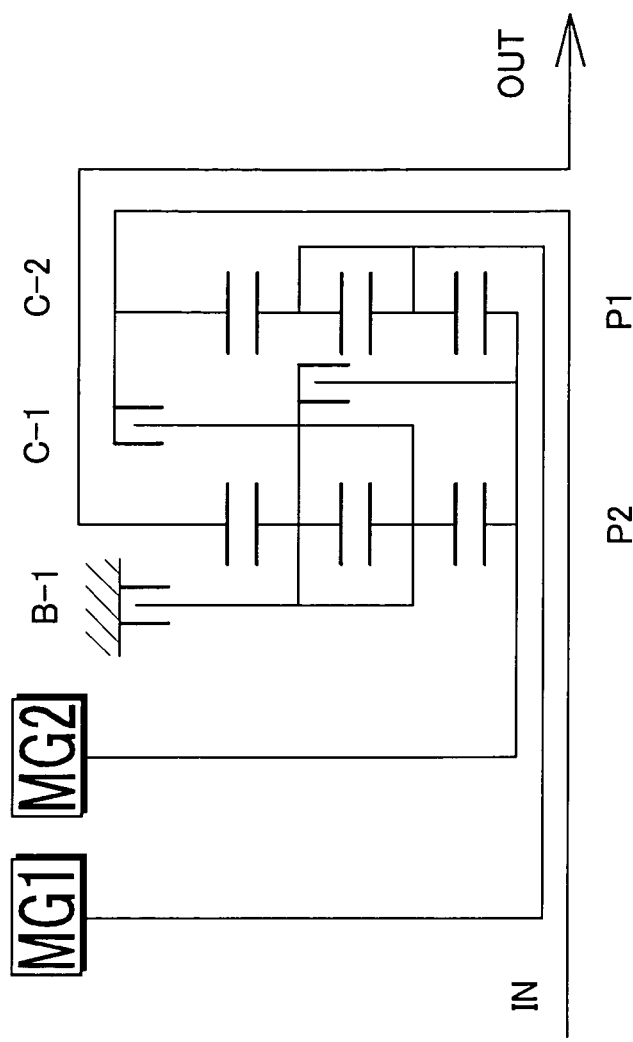
Figure 11:
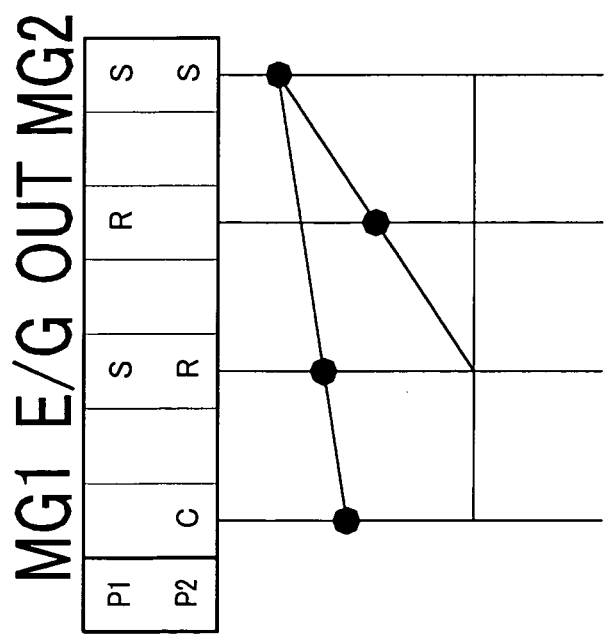
Figure 12:
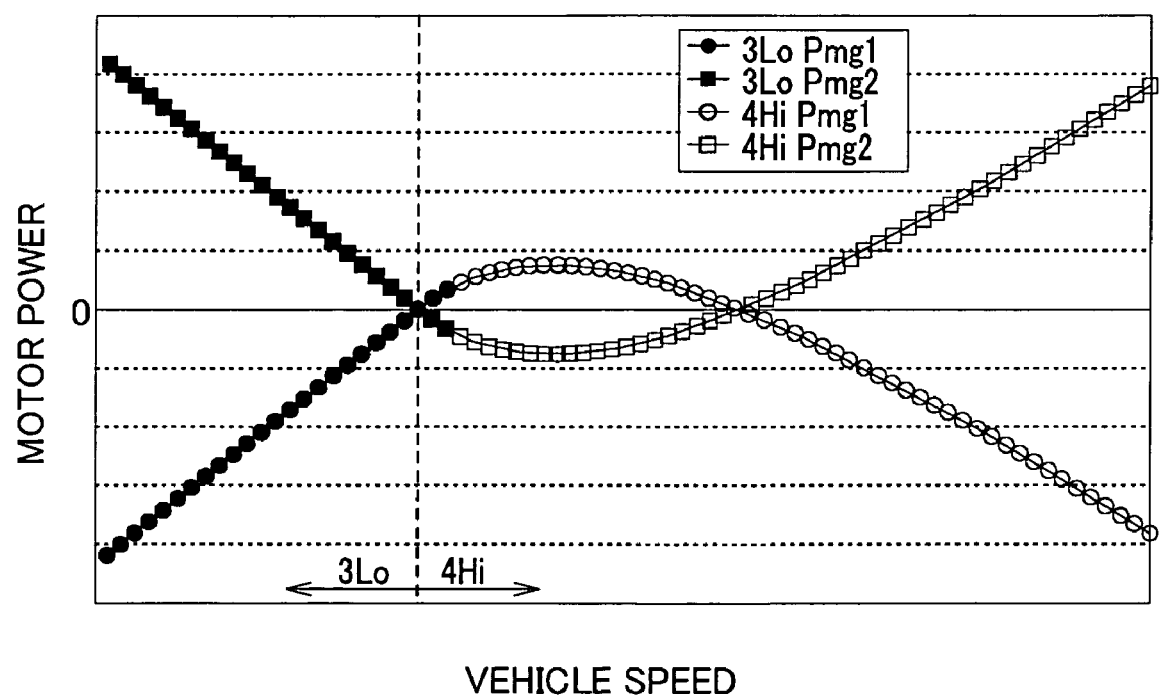
FIG. 12 is a graph showing the relationship between motor output and vehicle speed of a related drive unit.

Examples of various gear train structures to which the disclosure can be applied will now be described with reference to FIGS. 6 to 11. The examples shown in FIGS. 6 to 8 are modifications based on the gear train of the related art described in the beginning of this specification. The examples shown in FIGS. 9 to 11 are various modifications of a new kind of gear train which is different from that of the related art.

First, the example shown in FIG. 6(A) has two single pinion type differential gear units. A first electric machine MG1 is arranged between these two differential gear units and a second electric machine MG2 is arranged on the axial end on the output side. A second friction engagement element (clutch) C-2 couples a sun gear and a carrier of the second differential gear unit (reduction planetary gear) P2 together. The carrier serves as the output. The connective relationships of the three-element and reduction planetary gears P1, P2, the motor-generator MG1, the engine E/G, the output OUT, and the motor MG2 in the gear train are shown in chart form together with a velocity diagram, to the left of the drawing. The rows in the chart show the gear elements of the two planetary gears P1, P2, and the columns show the connective relationships of the gear elements. In FIGS. 6(A) to 8(C), the connection of elements shown in the left-most column is a direct connection, and the connection of elements shown in the right-most column is a connection via the first friction engagement element (clutch) C-1. In FIGS. 9(A) to 11(D), the connection of elements shown in the right-most column is a direct connection, and the connection of elements shown in the left-most column is a connection with the motor-generator MG1. The connection shown in the second column from the left is a connection with the engine E/G via the clutch C-1.

Incidentally in this example, the S (sun gear) of the P2 (reduction planetary gear) which is connected to the MG2 (motor) is directly connected to the R (ring gear) of the P1 (three-element planetary gear). The C (carrier) of the P1 is connected to the E/G (engine), the C (carrier) of the P2 is the OUT (output), and the R (ring gear) of the P2 which is connected to the MG2 (motor) is coupled to the S (sun gear) of the P1 via the C-1 (clutch). The same system of notation is used in all embodiments hereinafter. This example differs from the previous embodiment in that the ring gear of the reduction planetary gear P2 is coupled to the brake B-1 and thereby made a reaction element, and the motor MG2 is arranged on the axial end. Therefore, the input and output are not coaxial; rather the output (OUT) is a counter gear on a counter shaft suitable for a FF (front-engine, front-wheel drive) vehicle.

The example shown in FIG. 6(B) is an example in which a double pinion planetary gear is used as a first differential gear unit, and a single pinion planetary gear is used as the second differential gear unit. The second friction engagement element (clutch) C-2 in this case as well couples the carrier and the sun gear of the reduction planetary gear P2 together. The carrier serves as the output. In this example, the ring gear of the reduction planetary gear P2 is coupled to the brake B-1 and thereby made a reaction element. The second electric machine (motor) MG2 and the first electric machine (motor-generator) MG1 are both arranged between the three-element planetary gear P1 and the reduction planetary gear P2. Therefore, coaxial output from the reduction planetary gear P2 is possible, making it suitable for an FR (front-engine, rear-wheel drive) vehicle in which the input and output are coaxial. The output (OUT) can also be used in a FF vehicle.

Similarly, various gear train configurations are possible depending on the type of first differential gear unit and second differential gear unit, the positional and connective relationships of both electric machines with respect to those differential gear units, and the selection of gear elements that are connected by the second friction engagement element. To avoid redundancy, the same system of notation will be used in each embodiment and only the positional relationships, the types of differential gear units, and the connective relationships not illustrated in the chart will be described.

Figure 6C:
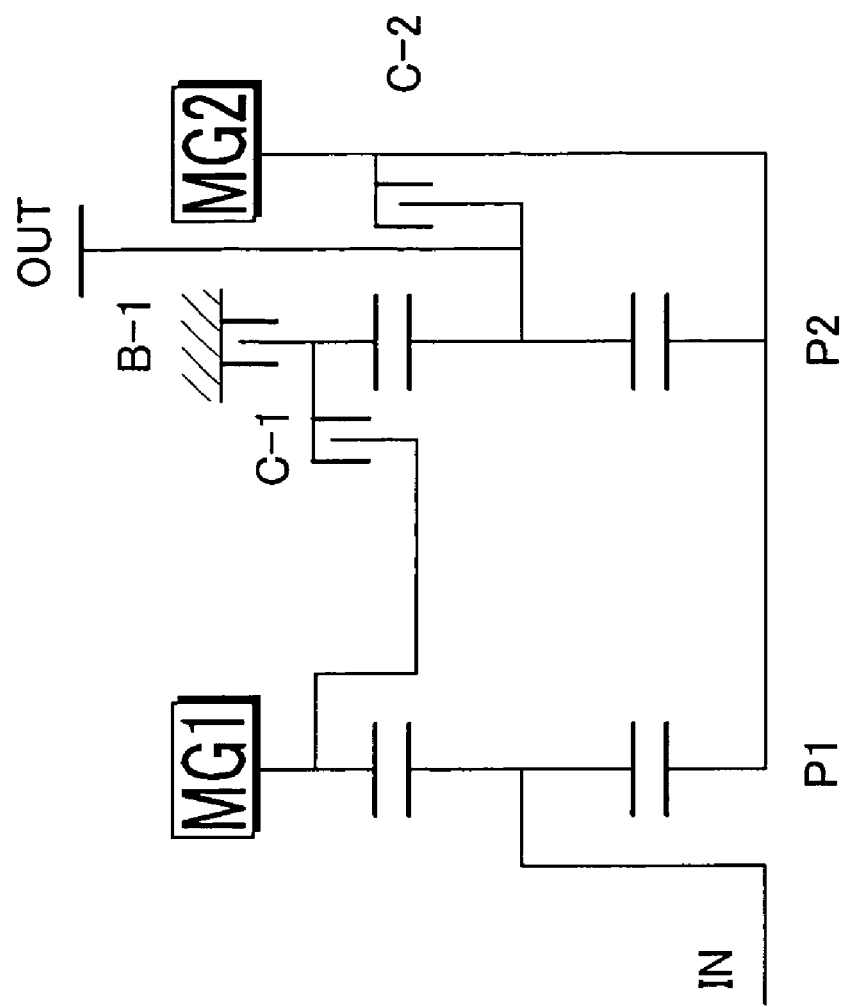
Figure 6C:
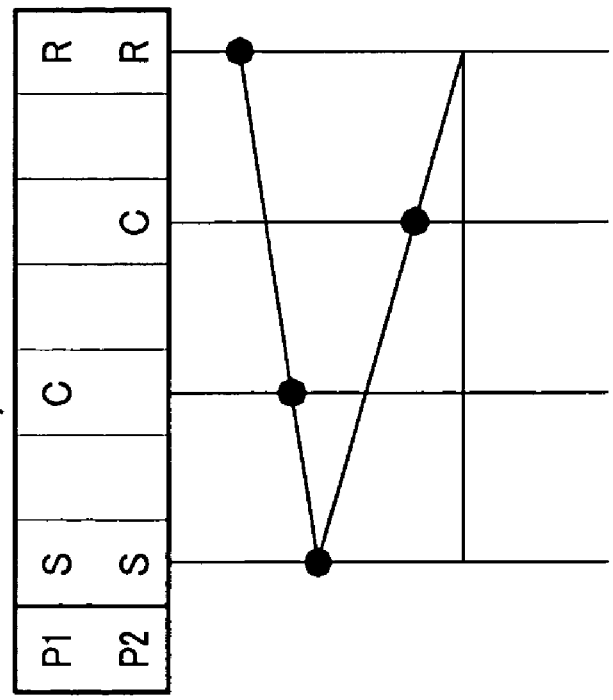
Figure 6:
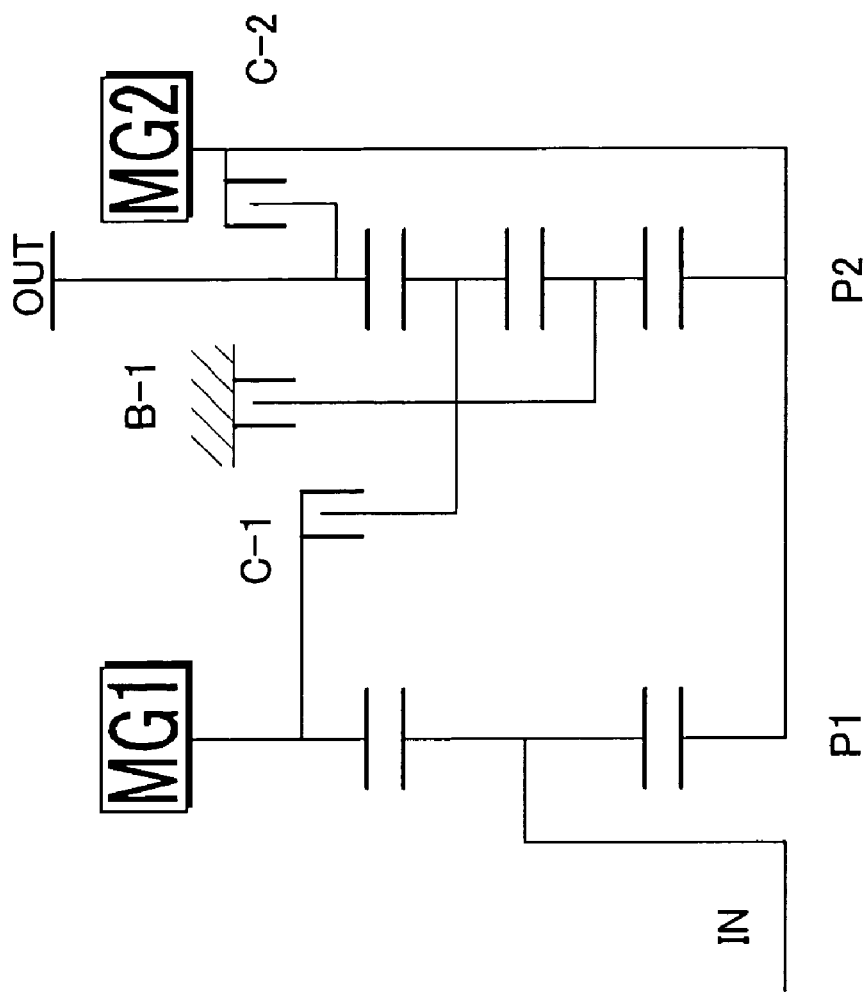
Figure 6:
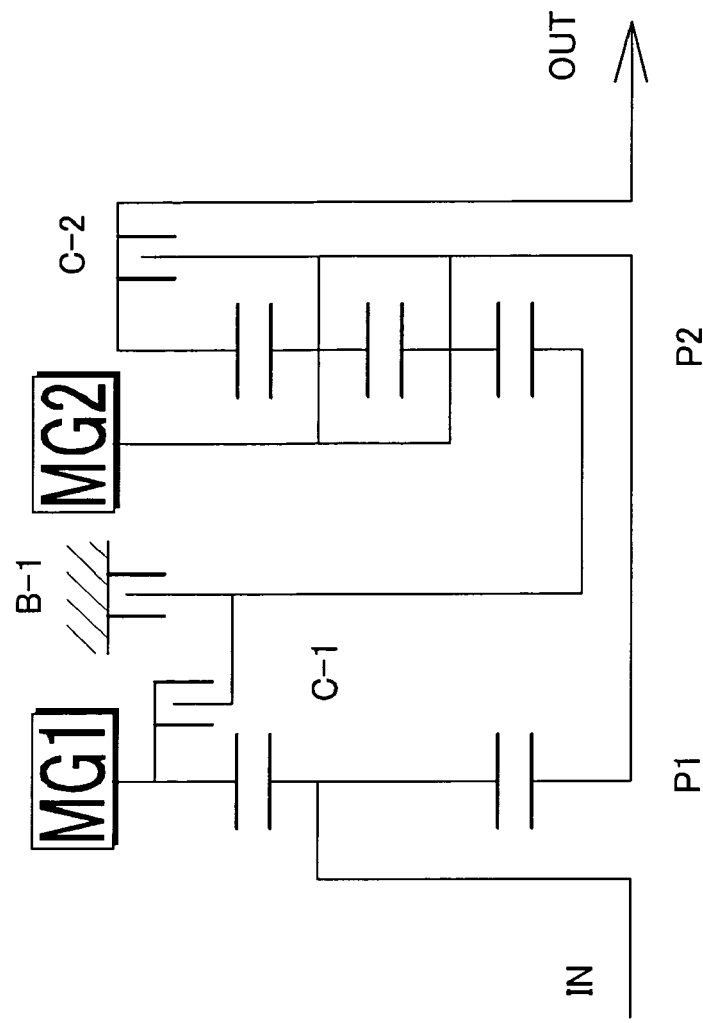
Figure 6:
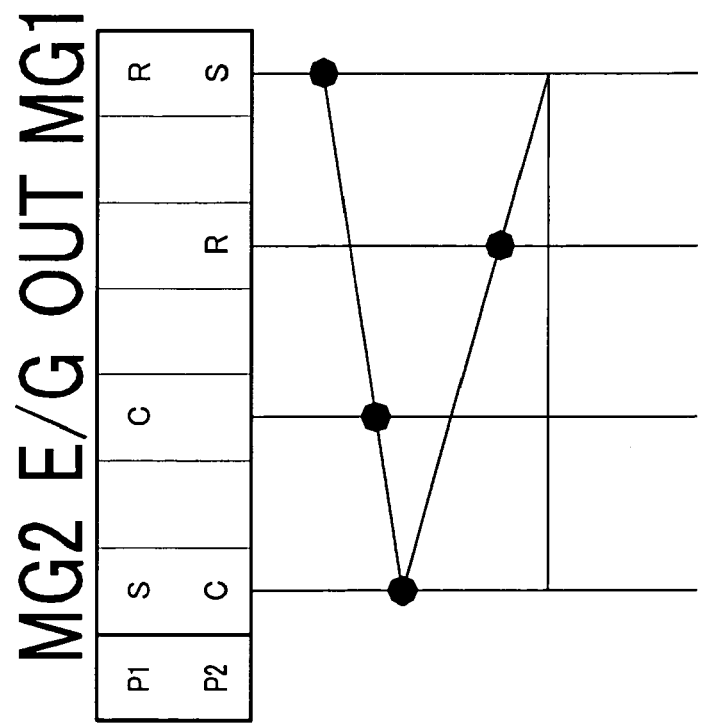
Figure 6:
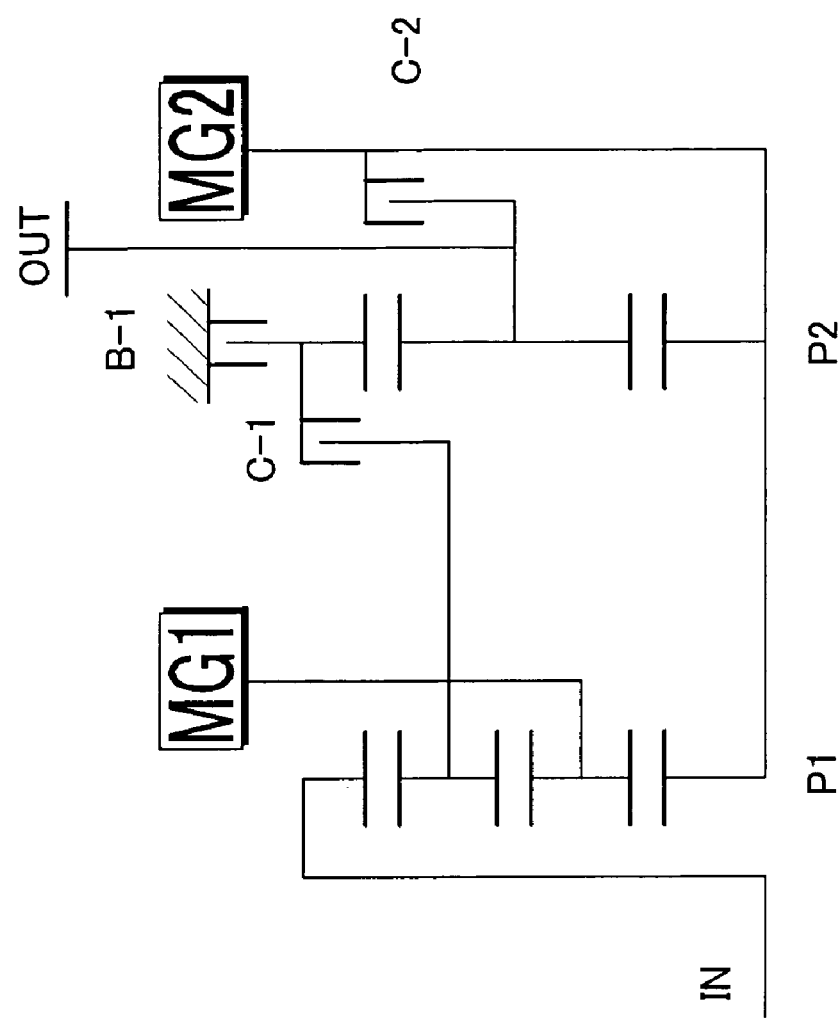

In the example shown in FIG. 6(C), single pinion planetary gears are used as both the first differential gear unit P1 and the second differential gear unit P2. The carrier and the sun gear of the second differential gear unit P2 are coupled together via the second friction engagement element C-2. In this case, the ring gear of the second differential gear unit P2 is held stationary by the third friction engagement element B-1.

In the example shown in FIG. 6(D), a single pinion planetary gear is used as the first differential gear unit P1 and a double pinion planetary gear is used as the second differential gear unit P2. The ring gear and the sun gear of the second differential gear unit P2 are coupled together via the second friction engagement element C-2. In this case, the carrier of the second differential gear unit P2 is held stationary by the third friction engagement element B-1.

In the example shown in FIG. 6(E), a single pinion planetary gear is used as the first differential gear unit P1 and a double pinion planetary gear is used as the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 6(F), a double pinion planetary gear is used as the first differential gear unit P1 and a single pinion planetary gear is used as the second differential gear unit P2. The carrier and the sun gear of the second differential gear unit P2 are coupled together via the second friction engagement element C-2. In this case, the ring gear of the second differential gear unit P2 is held stationary by the third friction engagement element B-1.

In the example shown in FIG. 7(A), a double pinion planetary gear is used as the first differential gear unit P1 and a single pinion planetary gear is used as the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 7(B), double pinion planetary gears are used as both the first differential gear unit P1 and the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 7(C), a single pinion planetary gear is used as the first differential gear unit P1 and a double pinion planetary gear is used as the second differential gear unit P2. The ring gear and the sun gear of the second differential gear unit P2 are coupled together via the second friction engagement element C-2. In this case, the carrier of the second differential gear unit P2 is held stationary by the third friction engagement element B-1.

In the example shown in FIG. 7(D), double pinion planetary gears are used as both the first differential gear unit P1 and the second differential gear unit P2. The ring gear and the sun gear of the second differential gear unit P2 are coupled together via the second friction engagement element C-2. In this case, the carrier of the second differential gear unit P2 is held stationary by the third friction engagement element B-1.

In the example shown in FIG. 7(E), single pinion planetary gears are used as both the first differential gear unit P1 and the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 8(A) which follows, a double pinion planetary gear is used as the first differential gear unit P1 and a single pinion planetary gear is used as the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 8(B), a single pinion planetary gear is used as the first differential gear unit P1 and a double pinion planetary gear is used as the second differential gear unit P2. Compared with the previous examples, the positional relationship of the planetary gears in this example is reversed with respect to input and output. In this case, the ring gear and the carrier of the second differential gear unit P2 are coupled together via the second friction engagement element C-2. In this case, the sun gear of the second differential gear unit P2 is held stationary by the third friction engagement element B-1.

Figure 8C:
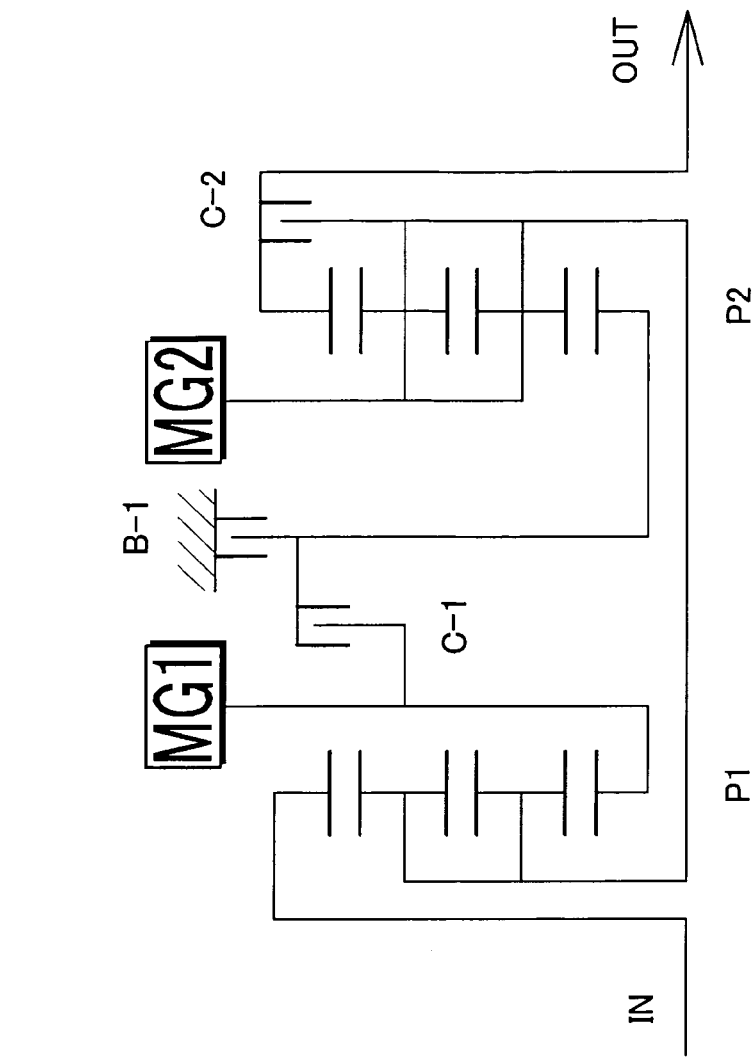

In the example shown in FIG. 8(C), double pinion planetary gears are used as both the first differential gear unit P1 and the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the drive trains shown in FIGS. 6(A) to 8(C) of the foregoing embodiments, the switch from the three-element Lo mode (3 Lo) to the four-element mode (4) is performed when the rotation speed of the MG1 is zero, as described above. Therefore, by applying the clutch C-1 to switch modes in this state, it is possible to shift when there is no rotation difference of the clutch, just as when the switch from the four-element mode to the three-element Hi mode is performed by a change over of the brake B-1 and the clutch C-1. As a result, both shift shock and the thermal load on the friction members can be reduced.

In the example shown in FIG. 9(A) which follows, single pinion planetary gears are used as both the first differential gear unit P1 and the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 9(B), a single pinion planetary gear is used as the first differential gear unit P1 and a double pinion planetary gear is used as the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 9(C), single pinion planetary gears are used as both the first differential gear unit P1 and the second differential gear unit P2. The positional relationship of the planetary gears in this example is reversed with respect to input and output. In this case, the carrier and the sun gear of the second differential gear unit P2 are coupled together via the second friction engagement element C-2. In this case, the ring gear of the second differential gear unit P2 is held stationary by the third friction engagement element B-1.

In the example shown in FIG. 9(D), a single pinion planetary gear is used as the first differential gear unit P1 and a double pinion planetary gear is used as the second differential gear unit P2. The positional relationship of the planetary gears in this example is reversed with respect to input and output. In this case, the carrier and the sun gear of the second differential gear unit P2 are coupled together via the second friction engagement element C-2. In this case, the carrier of the second differential gear unit P2 is held stationary by the third friction engagement element B-1.

Figure 9E:
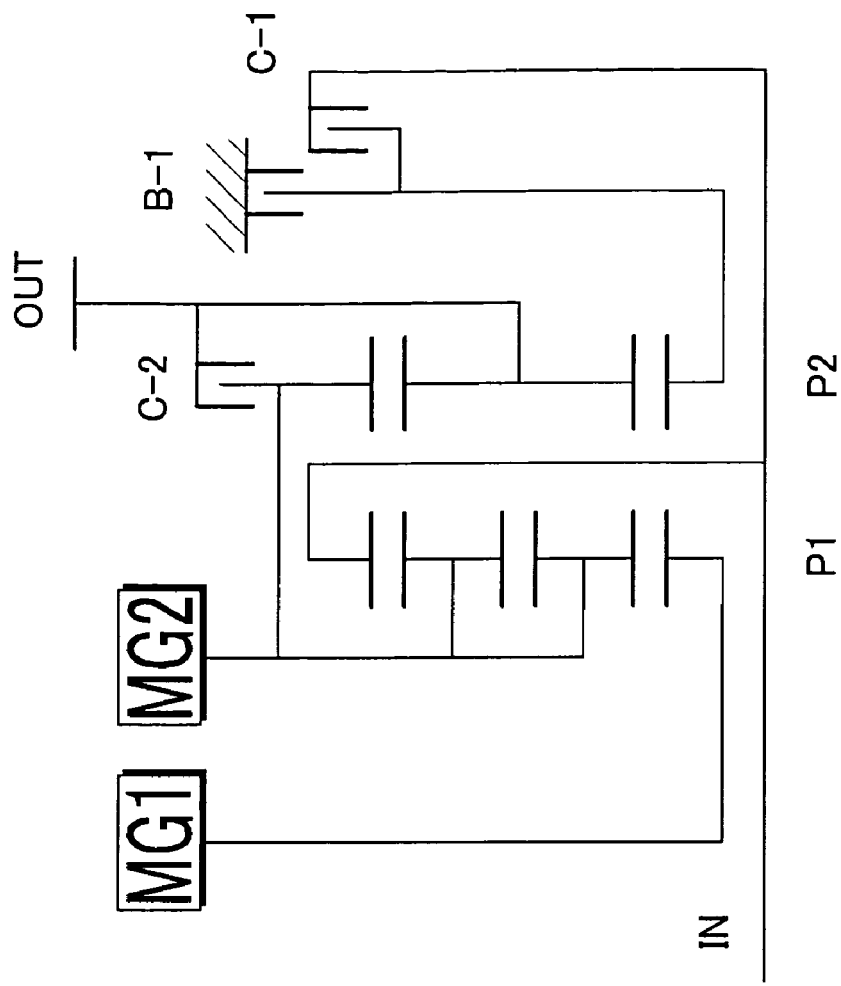
Figure 9E:
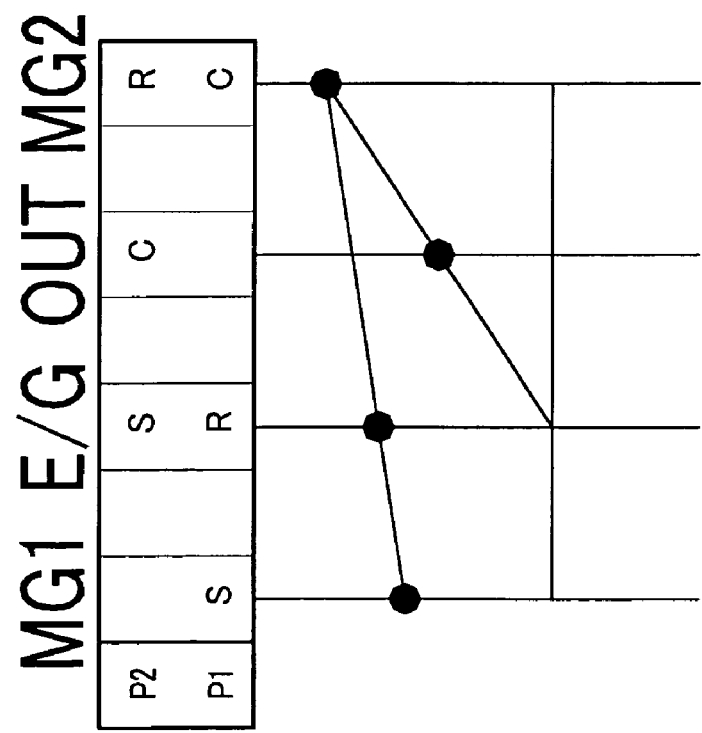
Figure 9:
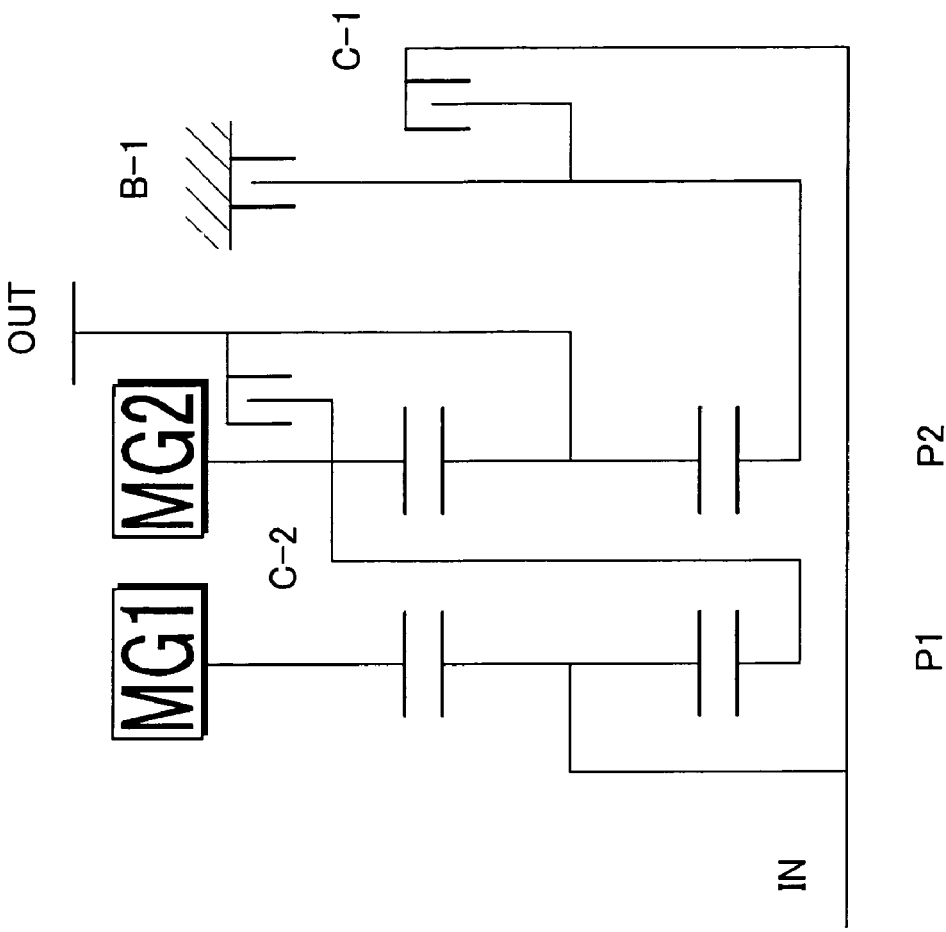

In the example shown in FIG. 9(E), a double pinion planetary gear is used as the first differential gear unit P1 and a single pinion planetary gear is used as the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 9(F), single pinion planetary gears are used as both the first differential gear unit P1 and the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 10(A), a double pinion planetary gear is used as the first differential gear unit P1 and a single pinion planetary gear is used as the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 10(B), double pinion planetary gears are used as both the first differential gear unit P1 and the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 10(C), double pinion planetary gears are used as both the first differential gear unit P1 and the second differential gear unit P2. The carrier and the sun gear of the second differential gear unit P2 are coupled together via the second friction engagement element C-2. In this case, the ring gear of the second differential gear unit P2 is held stationary by the third friction engagement element B-1.

In the example shown in FIG. 10(D), double pinion planetary gears are used as both the first differential gear unit P1 and the second differential gear unit P2. The positional relationship of the planetary gears in this example is reversed with respect to input and output. In this case, the carrier and the sun gear of the second differential gear unit P2 are coupled together via the second friction engagement element C-2. In this case, the carrier of the second differential gear unit P2 is held stationary by the third friction engagement element B-1.

In the example shown in FIG. 10(E), a single pinion planetary gear is used as the first differential gear unit P1 and a double pinion planetary gear is used as the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 10(F), double pinion planetary gears are used as both the first differential gear unit P1 and the second differential gear unit P2. The ring gear and the carrier of the second differential gear unit P2 are coupled together via the second friction engagement element C-2. In this case, the sun gear of the second differential gear unit P2 is held stationary by the third friction engagement element B-1.

In the example shown in FIG. 11(A), single pinion planetary gears are used as both the first differential gear unit P1 and the second differential gear unit P2. The carrier and the sun gear of the second differential gear unit P2 are coupled together via the second friction engagement element C-2. In this case, the ring gear of the second differential gear unit P2 is held stationary by the third friction engagement element B-1.

In the example shown in FIG. 11(B), a double pinion planetary gear is used as the first differential gear unit P1 and a single pinion planetary gear is used as the second differential gear unit P2. The carrier and the sun gear of the second differential gear unit P2 are coupled together via the second friction engagement element C-2. In this case, the ring gear of the second differential gear unit P2 is held stationary by the third friction engagement element B-1.

In the example shown in FIG. 11(C), a single pinion planetary gear is used as the first differential gear unit P1 and a double pinion planetary gear is used as the second differential gear unit P2. The ring gear and the sun gear of the second differential gear unit P2 are coupled together via the second friction engagement element C-2. In this case, the carrier of the second differential gear unit P2 is held stationary by the third friction engagement element B-1.

In the example shown in FIG. 11(D), double pinion planetary gears are used as both the first differential gear unit P1 and the second differential gear unit P2. The positional relationship of the planetary gears in this example is reversed with respect to input and output. In this case, the carrier and the sun gear of the second differential gear unit P2 are coupled together via the second friction engagement element C-2. In this case, the carrier of the second differential gear unit P2 is held stationary by the third friction engagement element B-1.

In each of the foregoing embodiments, the second electric machine MG2 is directoy connected to the second differential gear unit P2. Alternatively, however, the second electric machine MG2 may also be connected to the second differential gear unit P2 via a reduction mechanism. In this case, when the reduction mechanism is a planetary gear set, one of its gears elements is held stationary to provide reaction support, another of its gear elements is connected to the second electric machine MG2, and another of its gear elements is connected to a gear element of the second differential gear unit P2, which is connected to the first electric machine MG1, and a gear element other than a gear element that is directly connected to the gear element of the first differential gear unit. As an example of this, a structure can be employed in which, for example, the sun gear of the planetary gear set is connected to the second electric machine MG2, the carrier is held stationary, and the ring gear is coupled to the carrier of the second differential gear unit P2.

What is claimed is:

1. A hybrid drive unit, comprising:
   an input member which receives a driving force from an engine;
   an output member which outputs the driving force to a wheel;
   a first electric machine and a second electric machine;
   a first differential gear unit and a second differential gear unit, each differential gear unit including at least three gear elements; and
   at least three friction engagement elements, one being a first friction engagement element, one being a second friction engagement element, and one being a third friction engagement element,
   wherein one of the three gear elements of the first differential gear unit is coupled to the input member, another of the three gear elements of the first differential gear unit is connected to the first electric machine, and another of the gear elements of the first differential gear unit is coupled to the second electric machine;
   one of the gear elements of the second differential gear unit is connected to the output member;
   a plurality of output modes, including a direct drive mode of a rotational speed of the output member is same as the second electric machine, are achieved by selectively applying the first friction engagement element, the second friction engagement element, and the third friction engagement element;
   the third friction engagement element, by application of the third friction engagement element, reduces a rotation speed of the second electric machine; and
   the second friction engagement element, by application of the second friction engagement element, rotates the output member and the second electric machine at the same rotation speed.

2. A hybrid drive unit, comprising:
   an input member which receives a driving force from an engine;
   an output member which outputs the driving force to a wheel;
   a first electric machine and a second electric machine;
   a first differential gear unit and a second differential gear unit, each differential gear unit including at least three gear elements; and
   at least three friction engagement elements, one being a first friction engagement element, one being a second friction engagement element, and one being a third friction engagement element, wherein one of the three gear elements of the first differential gear unit is connected to the input member, another of the three gear elements of the first differential gear unit is connected to the first electric machine, and another of the gear elements of the first differential gear unit is connected to the second electric machine; one of the gear elements of the second differential gear unit is connected to the output member, another of the three gear elements of the second differential gear unit is connected to the third friction engagement element, and another of the gear elements of the second differential gear unit is connected to the second electric machine; the gear element of the second differential gear unit which is connected to the third friction engagement element is coupled, via the first friction engagement element, to one of the gear elements of the first differential gear unit, excluding the gear element that is directly connected to the second differential gear unit; and two of the gear elements of the second differential gear unit are interconnected via the second friction engagement element.

3. The hybrid drive unit according to claim 1, wherein when the output member is rotating and the rotation speed of the first electric machine is substantially zero, the third friction engagement element is released and the first friction engagement element is applied.

4. The hybrid drive unit according to claim 3, wherein when the output member is rotating and the rotation speeds of at least two from among the input member, the output member, the first electric machine, and the second electric machine are substantially the same, the first friction engagement element is released and the second friction engagement element is applied.

5. The hybrid drive unit according to claim 4, wherein the first differential gear unit and the second differential gear unit are gear units having four degrees of freedom by application of the first friction engagement element, and the input member, the output member, the first electric machine, and the second electric machine are connected to each gear element of the gear units having the four degrees of freedom.

6. The hybrid drive unit according to claim 5, wherein the gear element of the first differential gear unit, which is connected to the first electric machine, is coupled, via the first friction engagement element, to the gear element of the second differential gear unit, which is coupled to the third friction engagement element.

7. The hybrid drive unit according to claim 5, wherein the gear element of the first differential gear unit, which is connected to the input member, is coupled, via the first friction engagement element, to the gear element of the second differential gear unit, which is coupled to the third friction engagement element.

8. The hybrid drive unit according to claim 1, wherein the first differential gear unit and the second differential gear unit are gear units having four degrees of freedom by application of the first friction engagement element, and the input member, the output member, the first electric machine, and the second electric machine are connected to each gear element of the gear units having the four degrees of freedom.

9. A hybrid drive unit, comprising:
   an input member which receives a driving force from an engine;
   an output member which outputs the driving force to a wheel;
   a first electric machine and a second electric machine;
   a first differential gear unit and a second differential gear unit, each differential gear unit including at least three gear elements; and
   at least three friction engagement elements, one being a first friction engagement element, one being a second friction engagement element, and one being a third friction engagement element,
   wherein one of the three gear elements of the first differential gear unit is coupled to the input member, another of the three gear elements of the first differential gear unit is connected to the first electric machine, and another of the gear elements of the first differential gear unit is coupled to the second electric machine;
   one of the gear elements of the second differential gear unit is connected to the output member;

a plurality of output modes, including a direct drive mode of a rotational speed of the output member is same as the second electric machine, are achieved by selectively applying the first friction engagement element, the second friction engagement element, and the third friction engagement element; and the gear element of the first differential gear unit, which is connected to the first electric machine, is coupled, via the first friction engagement element, to the gear element of the second differential gear unit, which is coupled to the third friction engagement element.

10. The hybrid drive unit according to claim 2, wherein the third friction engagement element, by application of the third friction engagement element, reduces a rotation speed of the second electric machine.

11. The hybrid drive unit according to claim 2, wherein the second friction engagement element, by application of the second friction engagement element, rotates the output member and the second electric machine at the same rotation speed.

12. The hybrid drive unit according to claim 2, wherein when the output member is rotating and the rotation speed of the first electric machine is substantially zero, the third friction engagement element is released and the first friction engagement element is applied.

13. The hybrid drive unit according to claim 2, wherein when the output member is rotating and the rotation speeds of at least two from among the input member, the output member, the first electric machine, and the second electric machine are substantially the same, the first friction engagement element is released and the second friction engagement element is applied.

14. The hybrid drive unit according to claim 2, wherein the first differential gear unit and the second differential gear unit are gear units having four degrees of freedom by application of the first friction engagement element, and the input member, the output member, the first electric machine, and the second electric machine are connected to each gear element of the gear units having the four degrees of freedom.

15. The hybrid drive unit according to claim 2, wherein the gear element of the first differential gear unit, which is connected to the first electric machine, is coupled, via the first friction engagement element, to the gear element of the second differential gear unit, which is coupled to the third friction engagement element.

16. The hybrid drive unit according to claim 2, wherein the gear element of the first differential gear unit, which is connected to the input member, is coupled, via the first friction engagement element, to the gear element of the second differential gear unit, which is coupled to the third friction engagement element.

17. The hybrid drive unit according to claim 1, wherein when the output member is rotating and the rotation speeds of at least two from among the input member, the output member, the first electric machine, and the second electric machine are substantially the same, the first friction engagement element is released and the second friction engagement element is applied.

18. The hybrid drive unit according to claim 1, wherein the gear element of the first differential gear unit, which is connected to the input member, is coupled, via the first friction engagement element, to the gear element of the second differential gear unit, which is coupled to the third friction engagement element.

* * * * *